(12) United States Patent
Machida

(10) Patent No.: US 12,487,585 B2
(45) Date of Patent: Dec. 2, 2025

(54) CONTROL DEVICE, CONTROL METHOD, AND RECORDING MEDIUM

(71) Applicant: NEC Corporation, Tokyo (JP)

(72) Inventor: Manao Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/294,598

(22) PCT Filed: Aug. 11, 2021

(86) PCT No.: PCT/JP2021/029648
§ 371 (c)(1),
(2) Date: Feb. 2, 2024

(87) PCT Pub. No.: WO2023/017586
PCT Pub. Date: Feb. 16, 2023

(65) Prior Publication Data
US 2024/0345564 A1 Oct. 17, 2024

(51) Int. Cl.
*G05B 19/4155* (2006.01)
*G05D 1/221* (2024.01)
*G05D 1/698* (2024.01)

(52) U.S. Cl.
CPC ......... *G05B 19/4155* (2013.01); *G05D 1/221* (2024.01); *G05D 1/698* (2024.01); *G05B 2219/50391* (2013.01)

(58) Field of Classification Search
None
See application file for complete search history.

(56) References Cited

U.S. PATENT DOCUMENTS

2016/0320774 A1\* 11/2016 Kuhara ................ G05D 1/0287
2020/0198122 A1\* 6/2020 Newman ................ B25J 19/023
(Continued)

FOREIGN PATENT DOCUMENTS

JP 2000-295168 A 10/2000
JP 2006-338081 A 12/2006
(Continued)

OTHER PUBLICATIONS

International Search Report for PCT Application No. PCT/JP2021/029648, mailed on Sep. 28, 2021.
(Continued)

*Primary Examiner* — Jelani A Smith
*Assistant Examiner* — Davin Seol

(57) ABSTRACT

An acquisition unit (11) acquires information indicating the task performance ability possessed by one or more other autonomous behavior apparatuses. On the basis of the task performance ability possessed by a first autonomous behavior apparatus and the task performance ability possessed by the one or more other autonomous behavior apparatuses, a determination unit (12) determines a destination for the first autonomous behavior apparatus. A connection unit (13) communicatively connects a second autonomous behavior apparatus and the first autonomous behavior apparatus, said second autonomous behavior apparatus being among the one more more other autonomous behavior apparatuses with which the first autonomous behavior apparatus can communicate. A movement control unit (14) causes the first autonomous behavior apparatus to move to the destination while the communicative connection between the second autonomous behavior apparatus and the first autonomous behavior apparatus is maintained.

10 Claims, 17 Drawing Sheets

(56) References Cited

U.S. PATENT DOCUMENTS

2022/0147059 A1* 5/2022 Borne-Pons ......... G05D 1/6985
2022/0171385 A1* 6/2022 Cui ........................ H04W 4/46

FOREIGN PATENT DOCUMENTS

| JP | 2009-205644 A | 9/2009 |
| JP | 2017-182188 A | 10/2017 |
| JP | 2018-197731 A | 12/2018 |
| JP | 2019-003602 A | 1/2019 |
| JP | 2019-075066 A | 5/2019 |

OTHER PUBLICATIONS

English translation of Written opinion for PCT Application No. PCT/JP2021/029648, mailed on Sep. 28, 2021.
W. Luo, S. Yi and K. Sycara, "Behavior Mixing with Minimum Global and Subgroup Connectivity Maintenance for Large-Scale Multi-Robot Systems," 2020 IEEE International Conference on Robotics and Automation (ICRA), Paris, France, 2020, pp. 9845-9851, doi:10.1109/ICRA40945.2020.9197429. (2020).
A. D. Ames, X. Xu, J. W. Grizzle, and P. Tabuada, "Control barrier function based quadratic programs for safety critical systems," IEEE Transactions on Automatic Control, vol. 62, No. 8, pp. 3861-3876. (2016).

* cited by examiner

Fig.4

| TASK | TASK INFORMATION |
|------|------------------|
| 1 | PERFORMING POSITION = (0, 0); PRIORITY = 2; MODEL = ALL; STATUS = NOT PERFORMED, BIT VALUE = 10 − DISTANCE |
| 2 | PERFORMING POSITION = (5, 6); PRIORITY = 1; MODEL = ALL; STATUS = NOT PERFORMED, BIT VALUE = 10 − DISTANCE |
| 3 | PERFORMING POSITION = (10, 0); PRIORITY = 3; MODEL = ALL; STATUS = NOT PERFORMED, BIT VALUE = 10 − DISTANCE |

Fig.5

| STEP | BIT INFORMATION (TASK NUMBER, MAXIMUM BIT VALUE, IDENTIFICATION NUMBER OF AUTONOMOUS BEHAVIOR APPARATUSES HOLDING MAXIMUM BIT VALUE, TRANSMISSION SOURCE) | | | | | | | |
|---|---|---|---|---|---|---|---|---|
| | No.1 | No.2 | No.3 | No.4 | No.5 | No.6 | No.7 | No.8 |
| 0 | [(1, n, n, n)<br>(2, n, n, n)<br>(3, n, n, n)] | [(1, n, n, n)<br>(2, n, n, n)<br>(3, n, n, n)] | [(1, n, n, n)<br>(2, n, n, n)<br>(3, n, n, n)] | [(1, n, n, n)<br>(2, n, n, n)<br>(3, n, n, n)] | [(1, n, n, n)<br>(2, n, n, n)<br>(3, n, n, n)] | [(1, n, n, n)<br>(2, n, n, n)<br>(3, n, n, n)] | [(1, n, n, n)<br>(2, n, n, n)<br>(3, n, n, n)] | [(1, n, n, n)<br>(2, n, n, n)<br>(3, n, n, n)] |
| 1 | [(1,7.8,1,1)<br>(2,4.2,1,1)<br>(3,3.9,1,1)] | [(1,7.0,2,2)<br>(2,3.7,2,2)<br>(3,3.0,2,2)] | [(1,5.9,3,3)<br>(2,4.9,3,3)<br>(3,3.9,3,3)] | [(1,4.9,4,4)<br>(2,5.0,4,4)<br>(3,4.9,4,4)] | [(1,5.0,5,5)<br>(2,6.0,5,5)<br>(3,5.0,5,5)] | [(1,3.9,6,6)<br>(2,4.9,6,6)<br>(3,5.9,6,6)] | [(1,2.9,7,7)<br>(2,4.6,7,7)<br>(3,6.8,7,7)] | [(1,1.9,8,8)<br>(2,4.2,8,8)<br>(3,7.8,8,8)] |
| 2 | [(1,7.8,1,1)<br>(2,4.9,3,3)<br>(3,4.9,4,3)] | [(1,7.8,1,1)<br>(2,4.2,1,1)<br>(3,3.0,2,2)] | [(1,7.8,1,1)<br>(2,5.0,4,4)<br>(3,4.9,4,4)] | [(1,5.9,3,3)<br>(2,5.0,4,4)<br>(3,5.9,6,6)] | [(1,5.0,5,5)<br>(2,6.0,5,5)<br>(3,5.0,5,5)] | [(1,4.9,4,4)<br>(2,5.0,4,4)<br>(3,6.8,7,7)] | [(1,3.9,6,6)<br>(2,4.9,6,6)<br>(3,7.8,8,8)] | [(1,2.9,7,7)<br>(2,4.6,7,7)<br>(3,7.8,8,8)] |
| ... | ... | ... | ... | ... | ... | ... | ... | ... |
| k | [(1,7.8,1,1)<br>(2,5.0,4,3)<br>(3,7.8,8,3)] | [(1,7.8,1,1)<br>(2,5.0,4,1)<br>(3,7.8,8,1)] | [(1,7.8,1,1)<br>(2,5.0,4,4)<br>(3,7.8,8,4)] | [(1,7.8,1,3)<br>(2,5.0,4,4)<br>(3,7.8,8,6)] | [(1,7.8,1,4)<br>(2,5.0,4,4)<br>(3,7.8,8,4)] | [(1,7.8,1,4)<br>(2,5.0,4,4)<br>(3,7.8,8,7)] | [(1,7.8,1,6)<br>(2,5.0,4,6)<br>(3,7.8,8,8)] | [(1,7.8,1,7)<br>(2,5.0,4,7)<br>(3,7.8,8,8)] |

CONTROL DEVICE, CONTROL METHOD, AND RECORDING MEDIUM

This application is a National Stage Entry of PCT/JP2021/029648 filed on Aug. 11, 2021, the contents of all of which are incorporated herein by reference, in their entirety.

TECHNICAL FIELD

The present invention relates to a control device, a control method, and a recording medium, and more particularly, to a control device, a control method, and a recording medium that control an operation of an autonomous behavior apparatus.

BACKGROUND ART

A system that controls an operation even in a situation where a plurality of robots are distributed so that the plurality of robots cooperatively operate to perform a task even in a situation where the plurality of robots are distributed is referred to as a multi-agent system. Specific examples of the task are guidance of guests, guidance, transportation of luggage, cleaning, infrastructure inspection, security, or customer communication (NPL 1 and NPL 2).

In the mobile sensor network system described in PTL 1, local communication by a near-field wireless node is performed between one-to-one robots, and data observed by each robot is transmitted to another robot like a bucket relay. As a result, all the robots can share the observed data.

CITATION LIST

Patent Literature

PTL 1: JP 2006-338081 A

Non Patent Literature

NPL 1: W. Luo, S. Yi and K. Sycara, "Behavior Mixing with Minimum Global and Subgroup Connectivity Maintenance for Large-Scale Multi-Robot Systems," 2020 IEEE International Conference on Robotics and Automation (ICRA), Paris, France, 2020, pp. 9845-9851, doi: 10.1109/ICRA40945.2020.9197429. (2020)

NPL 2: A. D. Ames, X. Xu, J. W. Grizzle, and P. Tabuada, "Control barrier function based quadratic programs for safety critical systems," IEEE Transactions on Automatic Control, vol. 62, no. 8, pp. 3861-3876. (2016)

SUMMARY OF INVENTION

Technical Problem

In the mobile sensor network system described in PTL 1, a non-long effective distance exists in local communication used among a plurality of robots. Therefore, in order to maintain the communication network, restrictions are imposed on the movement of each robot. Therefore, in the method described in PTL 1, a plurality of robots (autonomous behavior apparatuses) cannot efficiently cope with a situation where a new task is added or performing points of a plurality of tasks are distributed.

An object of the present invention has been considered in view of the above problems, and an object is to cause a plurality of autonomous behavior apparatuses to efficiently perform a task even in a situation where the plurality of autonomous behavior apparatuses are distributed.

Solution to Problem

A control device according to an aspect of the present invention relates to a control device including an acquisition means that acquires information indicating a task performance ability possessed by one or more other autonomous behavior apparatuses, a determination means that determines a destination of a first autonomous behavior apparatus based on a task performance ability possessed by the first autonomous behavior apparatus and a task performance ability possessed by the one or more other autonomous behavior apparatuses, a connection means that communicably connects a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus, and a movement control means that moves the first autonomous behavior apparatus to the destination while maintaining a communicative connection between the second autonomous behavior apparatus and the first autonomous behavior apparatus.

A control method according to one aspect of the present invention includes the steps of acquiring information indicating a task performance ability possessed by one or more other autonomous behavior apparatuses, determining a destination of a first autonomous behavior apparatus based on a task performance ability possessed by the first autonomous behavior apparatus and a task performance ability possessed by the other autonomous behavior apparatus, communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus, and moving the first autonomous behavior apparatus to the destination while maintaining a communicative connection between the second autonomous behavior apparatus and the first autonomous behavior apparatus.

A recording medium according to one aspect of the present invention stores a program for causing a computer to execute acquiring information indicating a task performance ability possessed by one or more other autonomous behavior apparatuses, determining a destination of a first autonomous behavior apparatus based on a task performance ability possessed by the first autonomous behavior apparatus and a task performance ability possessed by the other autonomous behavior apparatus, communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus, and moving the first autonomous behavior apparatus to the destination while maintaining a communicative connection between the second autonomous behavior apparatus and the first autonomous behavior apparatus.

Advantageous Effects of Invention

According to one aspect of the present invention, even in a situation where a plurality of autonomous behavior apparatuses are distributed, the plurality of autonomous behavior apparatuses can be caused to efficiently perform a task.

BRIEF DESCRIPTION OF DRAWINGS

FIG. 4 is a diagram illustrating an example of task information for three tasks.

FIG. 5 is a diagram illustrating an example of transition of bit information of each of eight autonomous behavior apparatuses in steps 0 to k.

EXAMPLE EMBODIMENT

Some example embodiments will be described with reference to the drawings. In each of the following example embodiments, an "autonomous behavior apparatus" means a device that can autonomously behave separately and can perform work such as movement to a destination, avoidance of an obstacle, operation, transportation, or communication.

A robot that performs disaster relief activities, a robot that transports articles in a warehouse, and a robot that performs security of a facility are examples of the "autonomous behavior apparatus" in each example embodiment. However, the autonomous behavior apparatus is not limited to a humanoid robot such as a so-called Android. Furthermore, the application of the autonomous behavior apparatus is not limited to any industrial field.

First Example Embodiment

A first example embodiment will be described with reference to FIGS. 1 and 2.
(Control Device 10)

Figure 1:
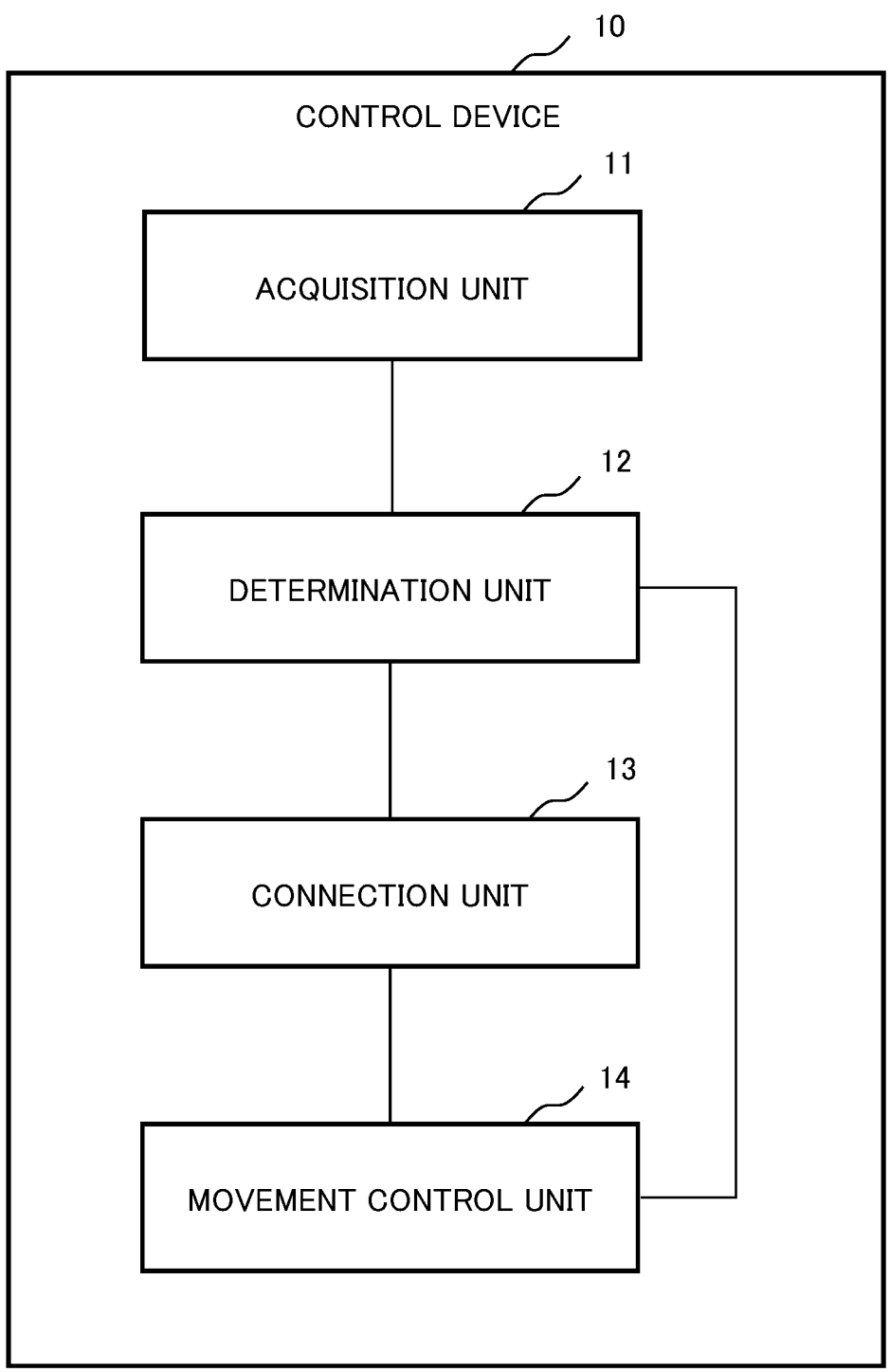
FIG. 1 is a block diagram illustrating a configuration of a control device according to a first example embodiment.

FIG. 1 is a block diagram illustrating a configuration of a control device 10 according to the first example embodiment. As illustrated in FIG. 1, the control device 10 includes an acquisition unit 11, a determination unit 12, a connection unit 13, and a movement control unit 14. Functions corresponding to the respective units of the control device 10 are realized by performing information processing in cooperation of hardware resources such as one or more processors and memories included in a certain autonomous behavior apparatus (hereinafter, referred to as a first autonomous behavior apparatus) and software resources such as programs and data.

The acquisition unit 11 acquires information indicating a task performance ability possessed by one or more other autonomous behavior apparatuses. The acquisition unit 11 is an example of an acquisition means. Here, "other" means different from the "first autonomous behavior apparatus". Furthermore, the acquisition unit 11 acquires task information. The task information is information related to a task to be performed. The task information includes position information indicating a performing point of the task.

In one example, the acquisition unit 11 receives, from other autonomous behavior apparatuses within an effective distance of communication (i.e., communicable) from the current position of the first autonomous behavior apparatus, information indicating a task performance ability possessed by the one or more other autonomous behavior apparatuses by using local communication such as near field communication. The local communication is, for example, infrared communication, Wi-Fi (registered trademark), Wi-SUN, radio waves, or optical communication. The information indicating the task performance ability possessed by one or more other autonomous behavior apparatuses indicates whether or not other autonomous behavior apparatuses are models capable of performing the task, how efficiently (that is, in how short a time) other autonomous behavior apparatuses can complete the task, and the like.

As an index indicating the task performance ability possessed by one or more other autonomous behavior apparatuses, for example, the closeness of the distance from the current position of the other autonomous behavior apparatus to the performing point of the task can be mentioned. Alternatively, the index indicating the task performance ability may be a shortness of the process time from arrival of the other autonomous behavior apparatus at the performing point of the task to completion of performing of the task.

The acquisition unit 11 outputs information indicating the task performance ability possessed by one or more other autonomous behavior apparatuses to the determination unit 12. The information indicating the task performance ability possessed by one or more other autonomous behavior apparatuses includes at least an index indicating the task performance ability possessed by one or more other autonomous behavior apparatuses.

The determination unit 12 determines the destination of the first autonomous behavior apparatus based on the task performance ability possessed by the first autonomous behavior apparatus and the task performance ability possessed by one or more other autonomous behavior apparatuses. The determination unit 12 is an example of a determination means.

In one example, the determination unit 12 receives, from the acquisition unit 11, information indicating a task performance ability possessed by one or more other autonomous behavior apparatuses. Furthermore, the determination unit 12 refers to a storage unit (not illustrated) and acquires information indicating a task performance ability possessed by the first autonomous behavior apparatus.

Alternatively, the determination unit 12 may obtain the task performance ability possessed by the first autonomous behavior apparatus by calculation using the current position of the first autonomous behavior apparatus and the performing point of the task as parameters. In this case, the determination unit 12 acquires information indicating the current position of the first autonomous behavior apparatus from a global positioning system (GPS) signal receiver or the like provided in the first autonomous behavior apparatus. Then, the determination unit 12 calculates the distance from the current position of the first autonomous behavior apparatus to the performing point of the task, and then, calculates an index indicating the task performance ability possessed by the first autonomous behavior apparatus based on the length of the distance.

In one example, the determination unit 12 compares the task performance ability possessed by the first autonomous behavior apparatus acquired as described above with the task performance ability possessed by one or more other autonomous behavior apparatuses. Specifically, the determination unit 12 checks a magnitude relationship between an index indicating a task performance ability possessed by the first autonomous behavior apparatus and an index of a task performance ability possessed by one or more other autonomous behavior apparatuses.

Then, in a case where the task performance ability possessed by the first autonomous behavior apparatus exceeds the task performance ability possessed by one or more other autonomous behavior apparatuses, the determination unit 12 determines the performing point of the task as the destination of the first autonomous behavior apparatus.

On the other hand, in a case where the task performance ability possessed by the first autonomous behavior apparatus is equal to or less than the task performance ability possessed by one or more other autonomous behavior apparatuses, the determination unit 12 determines the current position of the other autonomous behavior apparatus as the destination of the first autonomous behavior apparatus.

Note that, in a case where there is a plurality of other autonomous behavior apparatuses, the determination unit 12 may determine, as the destination of the first autonomous behavior apparatus, the current position of the other autonomous behavior apparatus that has notified the first autonomous behavior apparatus of the autonomous behavior apparatus having the highest task performance ability among the one or more other autonomous behavior apparatuses (second example embodiment).

The determination unit 12 outputs information indicating the determined destination of the first autonomous behavior apparatus to the connection unit 13 and the movement control unit 14. The information indicating the destination of the first autonomous behavior apparatus includes at least position information indicating the destination of the first autonomous behavior apparatus.

The connection unit 13 communicatively connects the second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus The connection unit 13 is an example of a connection means.

In one example, the connection unit 13 receives information indicating the destination of the first autonomous behavior apparatus from the determination unit 12. In a case where the destination of the first autonomous behavior apparatus is the performing point of the task, the connection unit 13 communicatively connects an arbitrary one (this is defined as a second autonomous behavior apparatus) of the one or more other autonomous behavior apparatuses communicable with the first autonomous behavior apparatus to the first autonomous behavior apparatus.

On the other hand, when the destination of the first autonomous behavior apparatus is the current position of the other autonomous behavior apparatus (this is defined as the second autonomous behavior apparatus), the connection unit 13 communicatively connects the second autonomous behavior apparatus at the destination and the first autonomous behavior apparatus.

Thereafter, the connection unit 13 notifies the movement control unit 14 of information (e.g., the identifier of the second autonomous behavior apparatus) specifying the second autonomous behavior apparatus, which is the counterpart with which the first autonomous behavior apparatus should maintain the communicative connection.

Furthermore, the connection unit 13 may manage a list of other autonomous behavior apparatuses with which the first autonomous behavior apparatus can communicate. The connection unit 13 sequentially updates this list according to the current state. For example, when a certain autonomous behavior apparatus in the list becomes uncommunicable, the connection unit 13 removes the identification number of that autonomous behavior apparatus from the list. On the other hand, when communication with a certain autonomous behavior apparatus outside the list becomes possible, the connection unit 13 adds the autonomous behavior apparatus number to the list.

The movement control unit 14 moves the first autonomous behavior apparatus to the destination while maintaining the communicative connection between the second autonomous behavior apparatus and the first autonomous behavior apparatus. The movement control unit 14 is an example of a movement control means.

In one example, the movement control unit 14 receives information indicating the destination of the first autonomous behavior apparatus from the determination unit 12. Furthermore, the movement control unit 14 receives, from the connection unit 13, information specifying the second autonomous behavior apparatus, which is the counterpart with which the first autonomous behavior apparatus should maintain the communicative connection.

Then, the movement control unit 14 performs a control input to the first autonomous behavior apparatus so as to move the first autonomous behavior apparatus toward the destination determined by the determination unit 12. At this time, the movement control unit 14 controls the movement of the first autonomous behavior apparatus so that the first autonomous behavior apparatus can maintain the communicative connection with the second autonomous behavior apparatus.

In one example, the movement control unit 14 performs a control input to the first autonomous behavior apparatus so that a distance between the first autonomous behavior apparatus and the second autonomous behavior apparatus that is a communicative connection destination does not go out of an effective distance of communication. This control input is achieved by, for example, a method using a control barrier function or the like as described in NPL 2.

(Operation of Control Device 10)

An example of the operation of the control device 10 according to the first example embodiment will be described with reference to FIG. 2. FIG. 2 is a flowchart illustrating a flow of processes executed by the control device 10.

Figure 2:
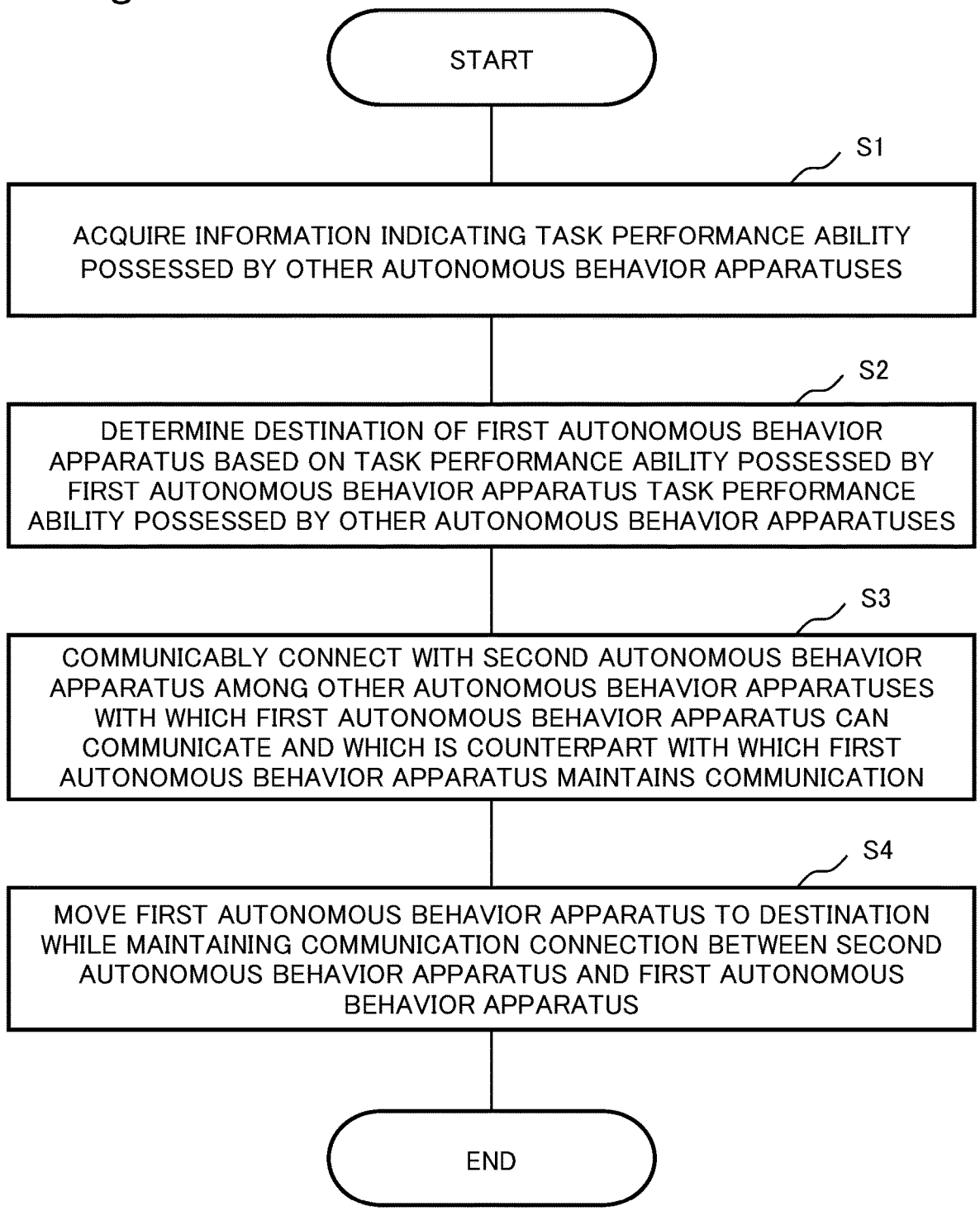
FIG. 2 is a flowchart illustrating an operation of the control device according to the first example embodiment.

As illustrated in FIG. 2, the acquisition unit 11 acquires information indicating a task performance ability possessed by one or more other autonomous behavior apparatuses (S1). The acquisition unit 11 outputs information indicating the task performance ability possessed by one or more other autonomous behavior apparatuses to the determination unit 12.

Next, the determination unit 12 receives, from the acquisition unit 11, information indicating a task performance ability possessed by one or more other autonomous behavior apparatuses. The determination unit 12 determines the destination of the first autonomous behavior apparatus based on the task performance ability possessed by the first autonomous behavior apparatus and the task performance ability possessed by one or more other autonomous behavior apparatuses (S2). The determination unit 12 outputs information indicating the determined destination of the first autonomous behavior apparatus to the connection unit 13 and the movement control unit 14.

Thereafter, the connection unit 13 receives information indicating the destination of the first autonomous behavior apparatus from the determination unit 12. The connection unit 13 communicatively connects the first autonomous behavior apparatus to the second autonomous behavior apparatus which is a counterpart with which the first autonomous behavior apparatus maintains communication among the one or more other autonomous behavior apparatuses with which the first autonomous behavior apparatus can communicate (S3). The connection unit 13 outputs information for specifying the second autonomous behavior apparatus to the movement control unit 14.

Finally, the movement control unit 14 receives information indicating the destination of the first autonomous behavior apparatus from the determination unit 12. Furthermore, the movement control unit 14 receives information specifying the second autonomous behavior apparatus from the connection unit 13. The movement control unit 14 moves the first autonomous behavior apparatus to the destination while maintaining the communicative connection between the second autonomous behavior apparatus and the first autonomous behavior apparatus (S4).

As described above, the operation of the control device 10 according to the first example embodiment ends.

Effects of Present Example Embodiment

According to the configuration of the present example embodiment, the acquisition unit 11 acquires information indicating a task performance ability possessed by one or more other autonomous behavior apparatuses. The determination unit 12 determines the destination of the first autonomous behavior apparatus based on the task performance ability possessed by the first autonomous behavior apparatus and the task performance ability possessed by one or more other autonomous behavior apparatuses. The connection unit 13 communicatively connects the second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus The movement control unit 14 moves the first autonomous behavior apparatus to the destination while maintaining the communicative connection between the second autonomous behavior apparatus and the first autonomous behavior apparatus.

As a result, the first autonomous behavior apparatus determines the destination of the own autonomous behavior apparatus based on the comparison result of the task performance ability possessed by the own autonomous behavior apparatus with respect to the task performance ability possessed by one or more other autonomous behavior apparatuses. In addition, the first autonomous behavior apparatus moves to the destination of the own autonomous behavior apparatus while maintaining the communicative connection with the second autonomous behavior apparatus. Therefore, even in a situation where a plurality of autonomous behavior apparatuses are distributed, it is possible to cause the plurality of autonomous behavior apparatuses to efficiently perform the task.

Second Example Embodiment

A second example embodiment will be described with reference to FIGS. 3 to 8. In the second example embodiment, the same reference numerals are given to the components common with the first example embodiment, and the description thereof will be omitted.

In the second example embodiment, an example of a method of regularly or irregularly exchanging information indicating a task performance ability possessed by each of a plurality of autonomous behavior apparatuses between a plurality of autonomous behavior apparatuses will be described.

In the second example embodiment, an index indicating a task performance ability is referred to as a "bit value". The bit value takes a larger value as the distance from the current position of a certain autonomous behavior apparatus to the performing point of the task becomes shorter. In other words, the bit value of the autonomous behavior apparatus becomes larger the higher the possibility that a certain autonomous behavior apparatus can reach the performing point of the task faster.

(Control Device 20)

Figure 3:
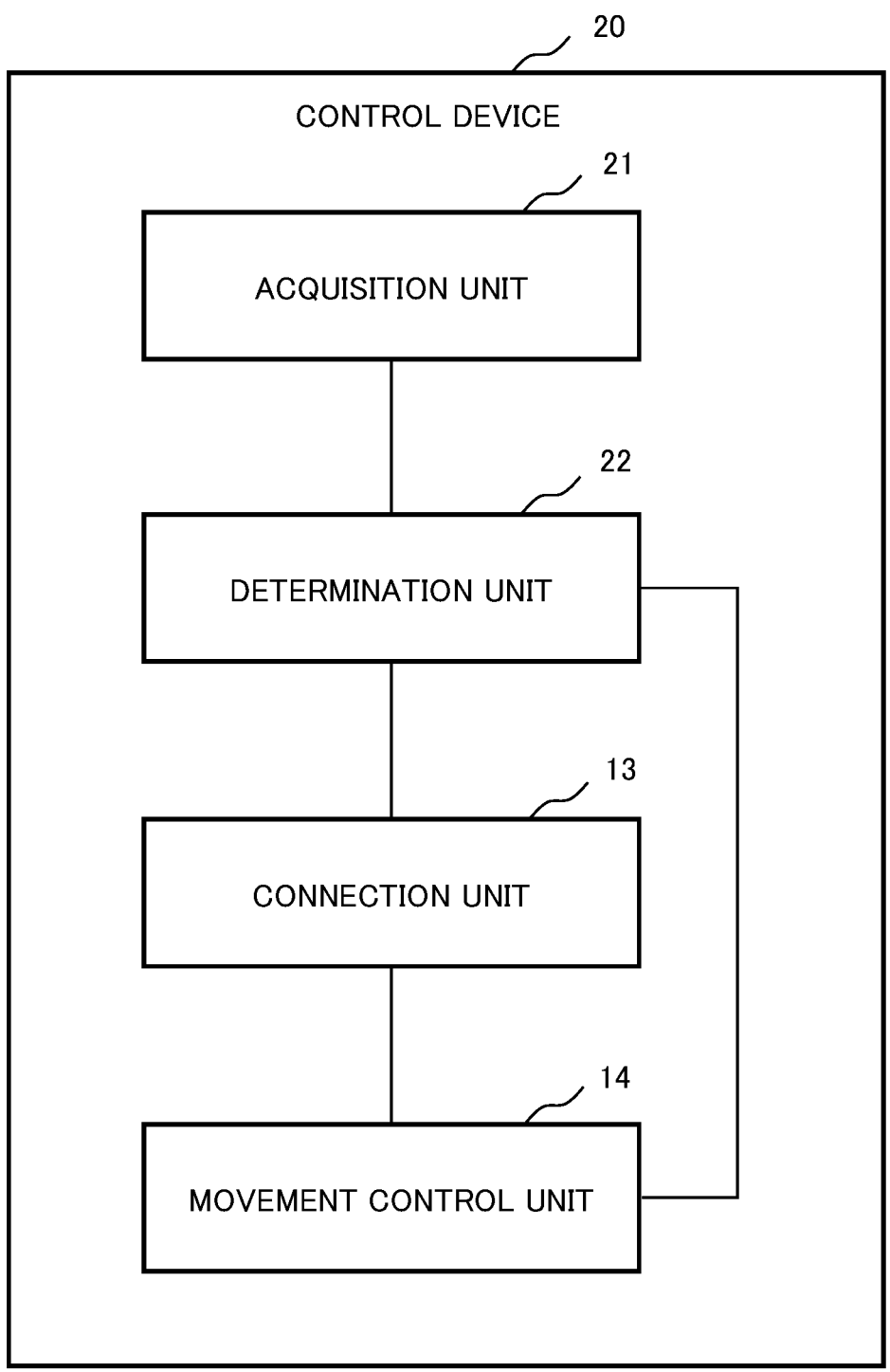
FIG. 3 is a block diagram illustrating a configuration of a control device according to a second example embodiment.

FIG. 3 is a block diagram illustrating a configuration of the control device 20 according to a second example embodiment. As illustrated in FIG. 3, the control device 20 includes an acquisition unit 21, a determination unit 22, a connection unit 13, and a movement control unit 14. Functions corresponding to the respective units of the control device 20 are realized by performing information processing such as analysis in cooperation of hardware resources such as one or more processors and memories included in a certain autonomous behavior apparatus (hereinafter, referred to as a first autonomous behavior apparatus) and software resources such as programs and data.

The acquisition unit 21 acquires, from other autonomous behavior apparatuses with which the first autonomous behavior apparatus can communicate, information indicating a task performance ability possessed by one or more other autonomous behavior apparatuses. The acquisition unit 21 is an example of an acquisition means. Furthermore, the acquisition unit 21 acquires task information. The task information is information related to a task to be performed.

The task information may be directly input to the first autonomous behavior apparatus in advance. Alternatively, the task information may be obtained by observation by each autonomous behavior apparatus, or may be input to the first autonomous behavior apparatus by an operator via a remote network. The operator inputs the latest task information only to one autonomous behavior apparatus.

Thereafter, the latest task information is propagated from the autonomous behavior apparatus to which the latest task information is externally input to other autonomous behavior apparatuses. In this way, the latest task information is transmitted to all the autonomous behavior apparatuses. The task information is stored in a storage unit provided in each of the plurality of autonomous behavior apparatuses.

Note that the transmission destination of the task information from a certain autonomous behavior apparatus must not be the same as the transmission source of the task information to the relevant autonomous behavior apparatus. This is to prevent the same task information from being looped between the autonomous behavior apparatuses.

Example of Task Information

FIG. 4 illustrates an example of the task information. As illustrated in FIG. 4, the task information includes a performing point and priority of a task, a model of an autonomous behavior apparatus capable of performing the task, a priority of the task, a method (formula) of calculating a bit value, and a status (not performed, performing, achieved) of the task.

The "performing position" in the task information is position coordinates (e.g., the performing point of the task No. 1 is (0, 0)) indicating the performing position of the task. The "model" represents a model of the autonomous behavior apparatus capable of performing the task. Depending on the task, only a specific type may be capable of performing the task, or only a specific type may be incapable of performing the task.

The "priority" of a task is an index indicating how important or urgent the task is. The larger the "priority" of a task, the more the performance of the task is prioritized over the others.

The "status" of the task information illustrated in FIG. 4 represents a progress status of the task. When no autonomous behavior apparatus has yet performed the task, a status related to the task is "not performed". On the other hand, when one of the autonomous behavior apparatuses is in the middle of performing the task, the status related to the task is "performing". Alternatively, when a certain autonomous behavior apparatus has completed the performing of the task, the status related to the task is "achieved".

Finally, the "bit value" of the task information is an index indicating task performance ability. The larger the bit value, the higher the task performance ability, and the smaller the bit value, the lower the task performance ability. In one example, the bit value is obtained by a calculation formula "(upper limit value)−(distance from the current position of the autonomous behavior apparatus to the task performing point)". This indicates how fast the first autonomous behavior apparatus can reach the performing point of the task.

The acquisition unit 21 outputs the acquired task information to the determination unit 22. Thereafter, the acquisition unit 21 outputs the latest task information to the determination unit 22 regularly or irregularly. In one example, the acquisition unit 21 outputs the updated task information to the determination unit 22 every time a new task is added.

The determination unit 22 determines the destination of the first autonomous behavior apparatus based on the task performance ability possessed by the first autonomous behavior apparatus and the task performance ability possessed by one or more other autonomous behavior apparatuses. The determination unit 22 is an example of a determination means.

Furthermore, the determination unit 22 receives the task information from the acquisition unit 21. The determination unit 22 calculates an index indicating task performance ability possessed by the first autonomous behavior apparatus according to the calculation formula (FIG. 4) of the bit value indicated in the task information. The determination unit 22 generates bit information including a bit value, and stores the bit information (FIG. 5) in a storage unit (not illustrated) of the first autonomous behavior apparatus.

Thereafter, the determination unit 22 regularly or irregularly receives the latest task information from the acquisition unit 21. The determination unit 22 updates the bit information stored in the storage unit of the first autonomous behavior apparatus each time the latest task information is received from the acquisition unit 21. An example of bit information updating process will be described below.

(Bit Information)

FIG. 5 is a list of bit information stored in the respective storage units of the autonomous behavior apparatuses No. 1 to No. 8.

First, in the storage unit of each autonomous behavior apparatus, the latest task information is stored as bit information of step 0. In FIG. 5, the bit information of step 0 is [(1, n, n, n) (2, n, n, n) (3, n, n, n)]. n represents a non-number.

Each small parenthesis constituting bit information ([ ]) corresponds to one task. The four numbers in parentheses represent, in order from the left, a task number, an identification number of the autonomous behavior apparatus having the maximum bit value, the maximum bit value, and a transmission source. Here, the autonomous behavior apparatus having the maximum bit value means, that is, an autonomous behavior apparatus having the highest task performance ability.

The downward direction of the vertical axis illustrated in FIG. 5 represents the direction in which time passes. For each step of 1 to k (k is a positive integer), bit information updating process (FIG. 6) to be described later is executed by the determination unit 22, and as a result, the bit information stored in the respective storage unit of the autonomous behavior apparatuses No. 1 to No. 8 is updated.

(Update of Bit Information)

Figure 6:
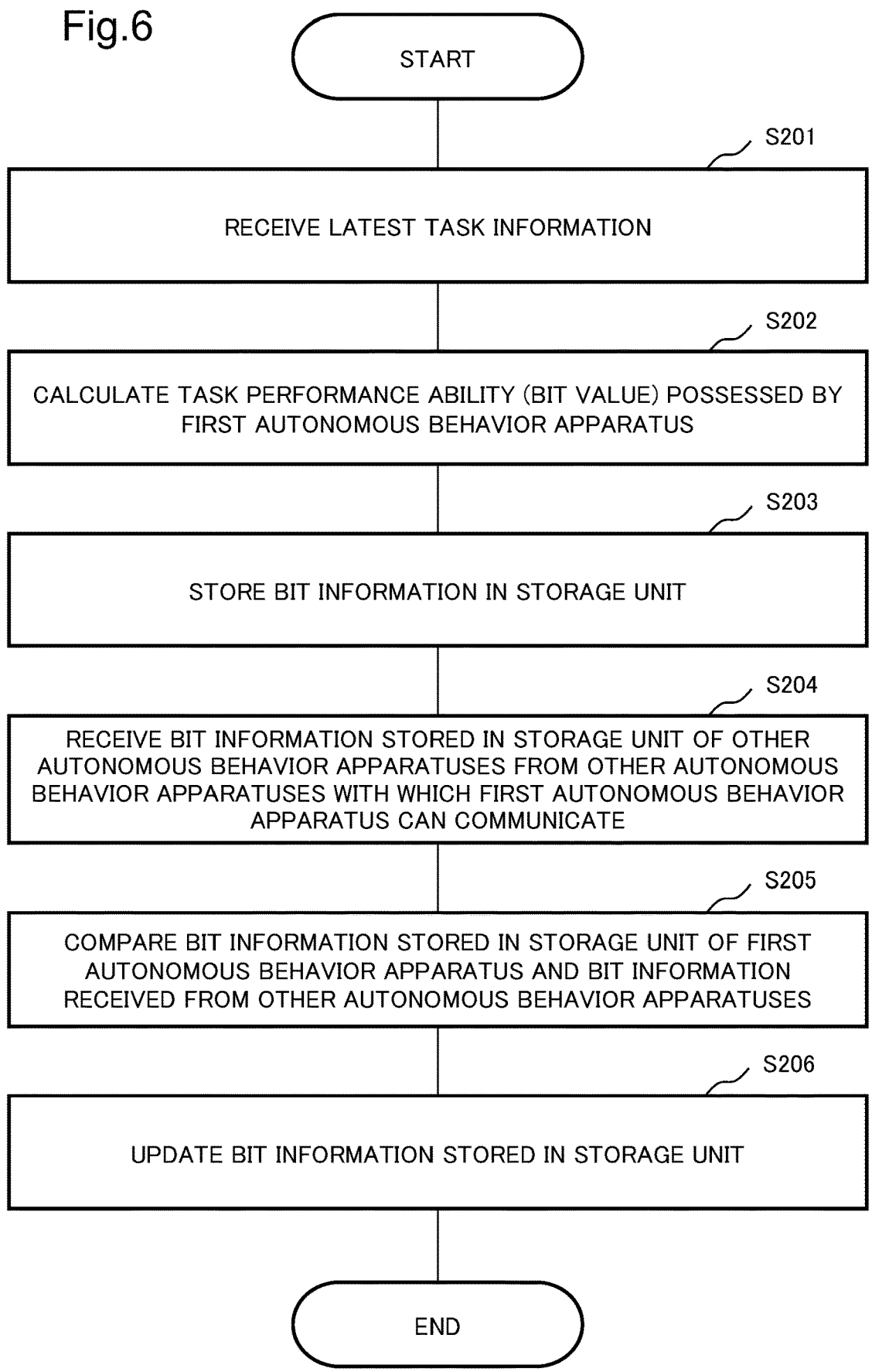
FIG. 6 is a flowchart illustrating an operation of the control device according to the second example embodiment.

The bit information updating process executed by the determination unit 22 will be described with reference to FIGS. 5 and 6. FIG. 6 is a flowchart illustrating a flow of bit information updating process.

In the following description, a "first autonomous behavior apparatus" is any one of the autonomous behavior apparatuses No. 1 to No. 8 illustrated in FIG. 5. Furthermore, the "second autonomous behavior apparatus" is different from the "first autonomous behavior apparatus" among the autonomous behavior apparatuses No. 1 to No. 8. For example, for the control device 10 that controls the autonomous behavior apparatus No. 1, the autonomous behavior apparatus No. 1 is the "first autonomous behavior apparatus", and the autonomous behavior apparatuses No. 2 to No. 8 are the "second autonomous behavior apparatus" or the "other autonomous behavior apparatus".

As described above, the acquisition unit 21 outputs the latest task information to the determination unit 22 regularly or irregularly. Each time, the determination unit 22 starts updating the information of the bit.

As illustrated in FIG. 6, the determination unit 22 receives the latest task information from the acquisition unit 21 (S201). The determination unit 22 stores the latest task information received from the acquisition unit 21 in the storage unit of the first autonomous behavior apparatus as bit information of step 0 illustrated in FIG. 5.

Next, the determination unit 22 calculates a bit value that is an index indicating the task performance ability possessed by the first autonomous behavior apparatus (S202). The determination unit 22 stores the calculated bit value in the storage unit of the first autonomous behavior apparatus as bit information of step 1 illustrated in FIG. 5 (S203).

For example, as illustrated in FIG. 5, the bit information of the autonomous behavior apparatus No. 1 in step 1 is [(1, 7.8, 1, 1) (2, 4.2, 1, 1) (3, 3.9, 1, 1)]. Here, the content of the bit information will be described by taking the small parentheses on the left side among the three small parentheses constituting the bit information.

Among the four numbers in the small parentheses, the two numbers on the left side represent that, for the task (hereinafter, referred to as a task No. 1) specified by the identification number "1", the maximum bit value is "7.8".

In addition, two numbers on the right side among the four numbers in the small parentheses indicate that the autonomous behavior apparatus having the maximum bit value is the autonomous behavior apparatus (here, the autonomous behavior apparatus No. 1.) specified by the identification number "1", and the transmission source of the bit information is the autonomous behavior apparatus (i.e., autonomous behavior apparatus No. 1) specified by the identification number "1".

Note that, in step 1, since each autonomous behavior apparatus has not yet performed communication with other autonomous behavior apparatuses, the number at the right end in the small parentheses of the bit information in step 1 is always the identification number of the own autonomous behavior apparatus.

Subsequently, the determination unit 22 receives the bit information stored in the storage unit of other autonomous behavior apparatuses from the one or more other autonomous behavior apparatuses with which the first autonomous behavior apparatus can communicate (S204). Then, the determination unit 22 compares the bit information stored in the storage unit of the first autonomous behavior apparatus with the bit information received from other autonomous behavior apparatuses (S205).

Finally, the determination unit 22 updates the bit information stored in the storage unit based on the comparison result in step S205 (S206). Specifically, in a case where the bit value included in the bit information received from other autonomous behavior apparatuses is larger than the bit value included in the bit information stored in the storage unit of the first autonomous behavior apparatus, the determination unit 22 updates the bit information stored in the storage unit of the first autonomous behavior apparatus.

For example, assume that the autonomous behavior apparatus No. 1 can communicate with only the autonomous behavior apparatus No. 3. In FIG. 5, the bit information of the autonomous behavior apparatus No. 3 in step 1 is [(1, 5.9, 3, 3) (2, 4.9, 3, 3) (3, 3.9, 3, 3)]. From this, regarding the task No. 2, the bit value of the autonomous behavior apparatus No. 3 is "4.9".

On the other hand, referring to the bit information of the autonomous behavior apparatus No. 1 in step 1, regarding the task No. 2, the bit value of the autonomous behavior apparatus No. 1 is "4.2". Therefore, in step 2, the determination unit 22 updates the bit information regarding the task No. 2 stored in the storage unit of the autonomous behavior apparatus No. 1 (FIG. 5).

Specifically, the determination unit 22 replaces the second number (representing the maximum bit value) from the left among the four numbers constituting the bit information related to the task No. 2 from "4.2" to "4.9".

Furthermore, the determination unit 22 replaces both the third number from the left (representing the identification number of the autonomous behavior apparatus having the maximum bit value) and the number at the right end (representing the identification number of the transmission source) among the four numbers constituting the bit information related to the task No. 2 with "3". In this way, the bit information regarding the task No. 2 stored in the storage unit of the autonomous behavior apparatus No. 1 is updated in step 2 (FIG. 5).

The flow of the bit information updating process from step 0 to step 2 illustrated in FIG. 6 has been described above.

Thereafter, the determination unit 22 repeats each process from step S204 to step S206.

Finally, in step k illustrated in FIG. 5, the bit information stored in the storage units of the group of autonomous behavior apparatuses No. 1 to No. 8 is matched. However, the number at the right end (the identification number of the autonomous behavior apparatus as the transmission source) is excluded from the four numbers constituting the bit information. Note that the value of k is defined according to the number of autonomous behavior apparatuses in the autonomous behavior apparatus group.

In a case where the number of autonomous behavior apparatuses in the autonomous behavior apparatus group is m, k=m−1. The reason is that, in the communication network of the autonomous behavior apparatus group, even between the two autonomous behavior apparatuses that are farthest from each other, the bit information can be transmitted by step (m−1).

In step k illustrated in FIG. 5, the determination unit 22 determines the destination of the first autonomous behavior apparatus by referring to the bit information stored in the storage unit of the first autonomous behavior apparatus.

Specifically, when the second number from the right (the identification number of the autonomous behavior apparatus having the maximum bit value) among the four numbers constituting the bit information related to the task is "1", the determination unit 22 sets the performing point of the task as the destination of the first autonomous behavior apparatus.

In a case other than the above, the determination unit 22 sets, as the destination of the first autonomous behavior apparatus, the current position of the other autonomous behavior apparatus specified by the number at the right end (the identification number of the autonomous behavior apparatus as the transmission source) among the four numbers constituting the bit information related to the task.

Note that, in a case where there is a plurality of tasks whose statuses are not performed, the determination unit 22 determines the destination of the first autonomous behavior apparatus for the task having the highest priority (FIG. 4) through the procedure described above.

Thereafter, the connection unit 13 communicatively connects the second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus.

The movement control unit 14 moves the first autonomous behavior apparatus to the destination while maintaining the communicative connection between the second autonomous behavior apparatus and the first autonomous behavior apparatus.

Hereinafter, an example of movement control of the autonomous behavior apparatus by the movement control unit 14 will be described.

Example of Movement Control of Autonomous Behavior Apparatus

An example of movement control of the autonomous behavior apparatus by the movement control unit 14 will be described with reference to FIGS. 7 to 8. Here, how each autonomous behavior apparatus is moved in a case where the task No. 3 having the highest priority (FIG. 4) is not performed will be specifically described with reference to the drawings.

Figure 7:
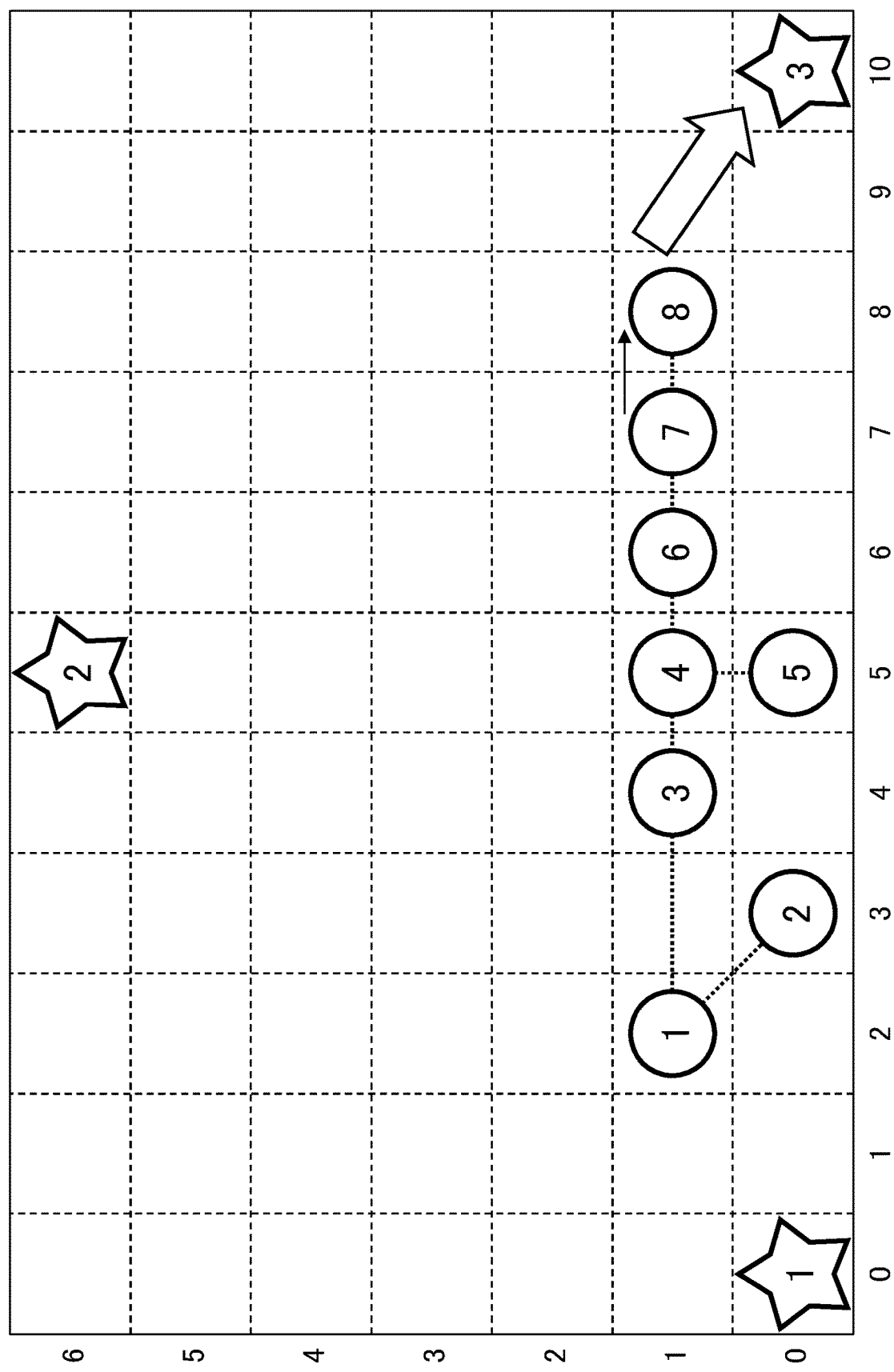
FIG. 7 is a diagram illustrating initial position distributions of three tasks and eight autonomous behavior apparatuses in the second example embodiment.

FIG. 7 is a map illustrating performing points of tasks No. 1 to No. 3 and initial positions of the autonomous behavior apparatuses of tasks No. 1 to No. 8. Regarding the task No. 3, the autonomous behavior apparatus No. 8 has the maximum bit value (FIG. 5).

Therefore, the autonomous behavior apparatus No. 8 sets the performing point of the task No. 3 as the destination.

On the other hand, the one or more other autonomous behavior apparatuses have the current position of the autonomous behavior apparatus that is the transmission source of the bit information related to the task No. 3 as the destination. Here, attention is focused only on the movements of the autonomous behavior apparatus No. 7 and the autonomous behavior apparatus No. 8.

Referring to the bit information (FIG. 5) of the autonomous behavior apparatus No. 7, for the autonomous behavior apparatus No. 7, the autonomous behavior apparatus No. 8 is a transmission source of the bit information related to the task No. 3.

Therefore, for the autonomous behavior apparatus No. 7, the autonomous behavior apparatus No. 8 corresponds to a counterpart that maintains communicative connection. Therefore, a communicative connection is established between the autonomous behavior apparatus No. 7 and the autonomous behavior apparatus No. 8 by the connection unit 13 of the control device 20 provided in the autonomous behavior apparatus No. 7.

As illustrated in FIG. 7, the autonomous behavior apparatus No. 8 starts moving toward the performing point of the task No. 3. The movement control unit 14 of the control device 20 included in the autonomous behavior apparatus No. 8 moves the autonomous behavior apparatus No. 8. In FIG. 7, a thin arrow indicates direction of tracking, and a thick arrow indicates direction of destination.

On the other hand, the autonomous behavior apparatus No. 7 starts moving toward the current position of the autonomous behavior apparatus No. 8. The movement control unit 14 of the control device 20 included in the autonomous behavior apparatus No. 7 moves the autonomous behavior apparatus No. 7.

Figure 8:
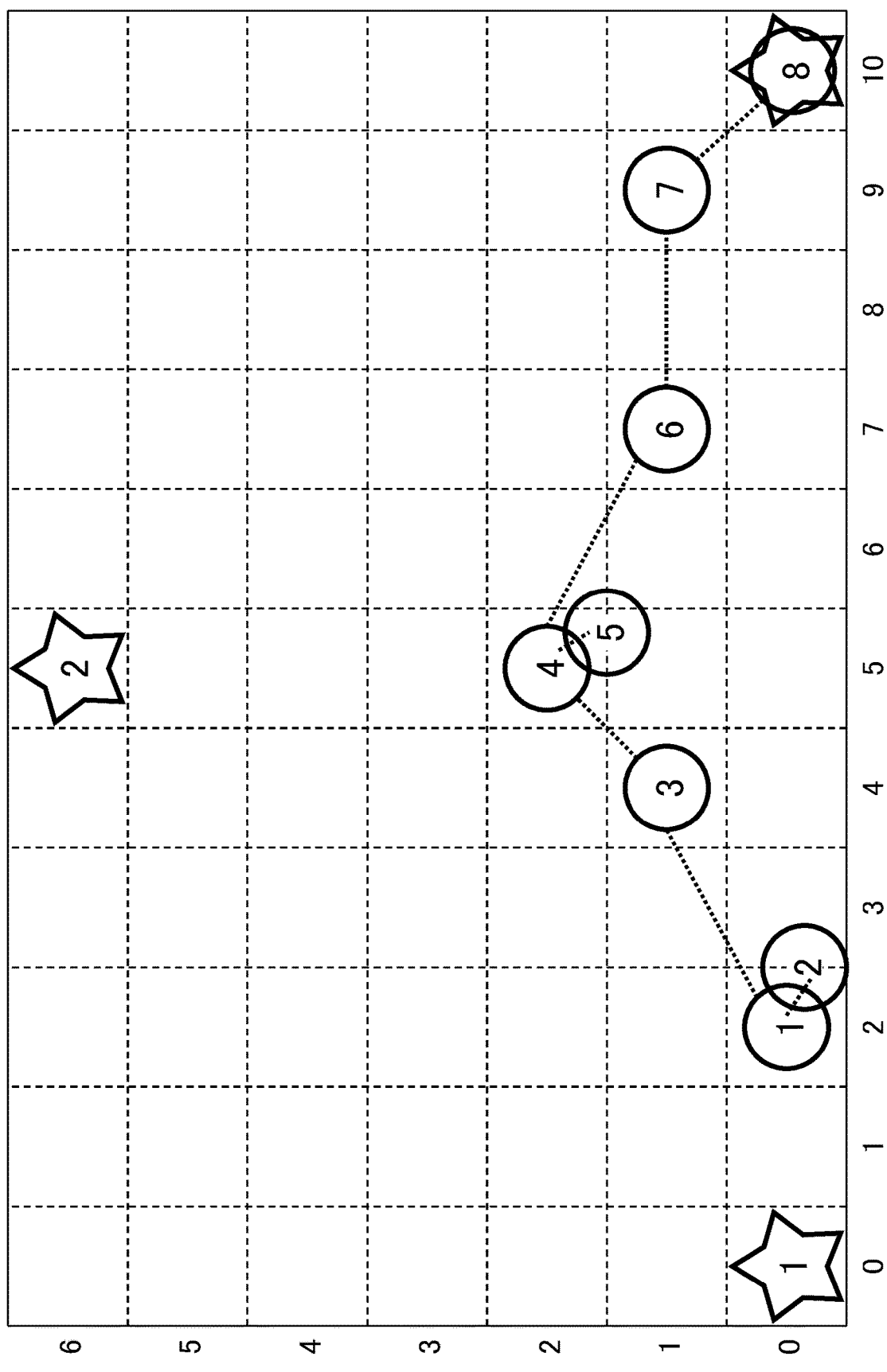
FIG. 8 is a diagram illustrating a position distribution after one flow of three tasks and eight autonomous behavior apparatuses in the second example embodiment.

FIG. 8 illustrates that the autonomous behavior apparatus No. 8 has arrived at the performing point of the task No. 3. At this time, or before or after that, the autonomous behavior apparatus No. 7 has arrived at the position where the autonomous behavior apparatus No. 8 was.

As described above, the autonomous behavior apparatus No. 7 moves so as to track the autonomous behavior apparatus No. 8, whereby the autonomous behavior apparatus No. 7 can maintain the communicative connection with the autonomous behavior apparatus No. 8. In addition, the autonomous behavior apparatus No. 8 can move to the performing point of the task No. 3 without going out of the effective distance of communication with the autonomous behavior apparatus No. 7.

In other words, since the autonomous behavior apparatus No. 7 moves so as to track the autonomous behavior apparatus No. 8, the restriction related the movement with respect to the autonomous behavior apparatus No. 8 can be reduced.

Effects of Present Example Embodiment

According to the configuration of the present example embodiment, the acquisition unit 21 acquires information indicating the task performance ability possessed by one or more other autonomous behavior apparatuses. The determination unit 22 determines the destination of the first autonomous behavior apparatus based on the task performance ability possessed by the first autonomous behavior apparatus and the task performance ability possessed by one or more other autonomous behavior apparatuses. The connection unit 13 communicatively connects the second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus The movement control unit 14 moves the first autonomous behavior apparatus to the destination while maintaining the communicative connection between the second autonomous behavior apparatus and the first autonomous behavior apparatus.

As a result, the first autonomous behavior apparatus determines the destination of the own autonomous behavior apparatus based on the comparison result of the task performance ability possessed by the own autonomous behavior apparatus with respect to the task performance ability possessed by one or more other autonomous behavior apparatuses.

In addition, the first autonomous behavior apparatus moves to the destination of the own autonomous behavior apparatus while maintaining the communicative connection with the second autonomous behavior apparatus. Therefore, even in a situation where a plurality of autonomous behavior apparatuses are distributed, it is possible to cause the plurality of autonomous behavior apparatuses to efficiently perform the task.

Furthermore, according to the configuration of the present example embodiment, since the information indicating the task performance ability possessed by each autonomous behavior apparatus is exchanged between the autonomous behavior apparatus groups, the autonomous behavior apparatus having the highest performance ability can be caused to efficiently perform the task.

Third Example Embodiment

A third example embodiment will be described with reference to FIGS. 9 to 16. In the third example embodiment, the same reference numerals are given to the components common to the first example embodiment or the second example embodiment, and the description thereof will be omitted. In the third example embodiment, a configuration in which the communicative connection destination of the first autonomous behavior apparatus can be dynamically changed will be described.

(Control Device 30)

Figure 9:
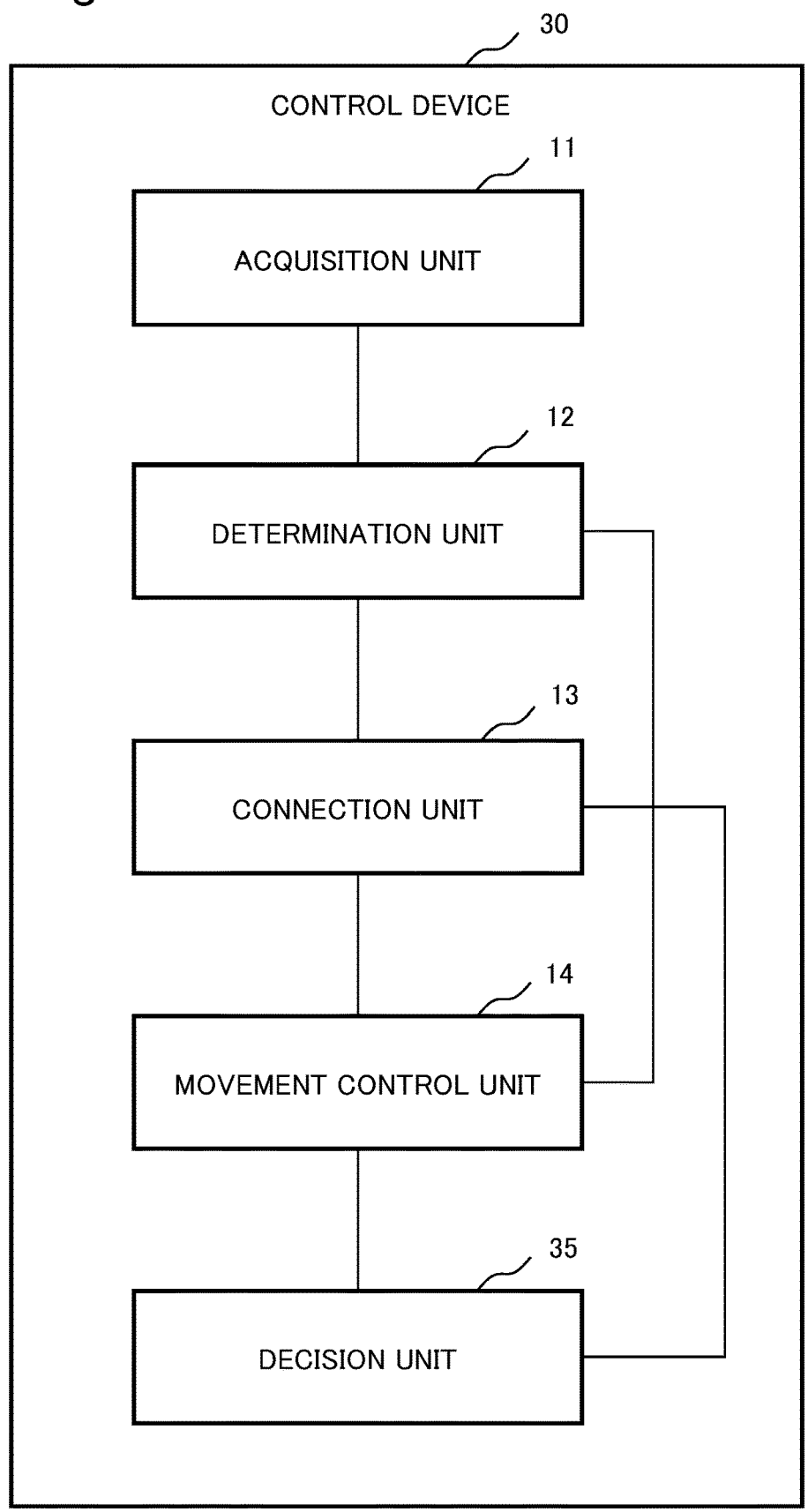
FIG. 9 is a block diagram illustrating a configuration of a control device according to a third example embodiment.

FIG. 9 is a block diagram illustrating a configuration of the control device 30 according to the third example embodiment. As illustrated in FIG. 9, the control device 30 includes an acquisition unit 11, a determination unit 12, a connection unit 13, and a movement control unit 14. The control device 30 further includes a decision unit 35. Functions corresponding to the respective units of the control device 30 are realized by performing information processing such as analysis in cooperation of hardware resources such as one or more processors and memories included in a certain autonomous behavior apparatus (hereinafter, referred to as a first autonomous behavior apparatus) and software resources such as programs and data.

The decision unit 35 decides whether or not the first autonomous behavior apparatus can reach the destination while maintaining the communicative connection between the second autonomous behavior apparatus and the first autonomous behavior apparatus. The decision unit 35 is an example of a decision means.

In one example, the decision unit 35 calculates a first control input for movement of the first autonomous behavior apparatus to the destination and a second control input in consideration of maintaining a communicative connection with the second autonomous behavior apparatus. If the difference between the first control input and the second control input is equal to or less than the threshold value, the decision unit 35 decides that the first autonomous behavior apparatus can reach the destination.

On the other hand, when the difference between the first control input and the second control input is larger than the threshold value, the decision unit 35 decides that the first autonomous behavior apparatus cannot reach the destination while maintaining the communicative connection with the second autonomous behavior apparatus. This is because, considering that the first autonomous behavior apparatus cannot go out from the effective distance of communication with the second autonomous behavior apparatus, the first autonomous behavior apparatus cannot reach the destination.

In another example, the decision unit 35 decides whether or not the first autonomous behavior apparatus can reach the destination while maintaining the communicative connection with the second autonomous behavior apparatus based on the restriction regarding the movement of the second autonomous behavior apparatus and the effective distance of communication.

In a case where the first autonomous behavior apparatus cannot reach the destination while maintaining the communicative connection with the second autonomous behavior apparatus, the decision unit 35 instructs the connection unit 13 to release the communicative connection between the second autonomous behavior apparatus and the first autonomous behavior apparatus.

(Operation of Control Device 30)

Figure 10:
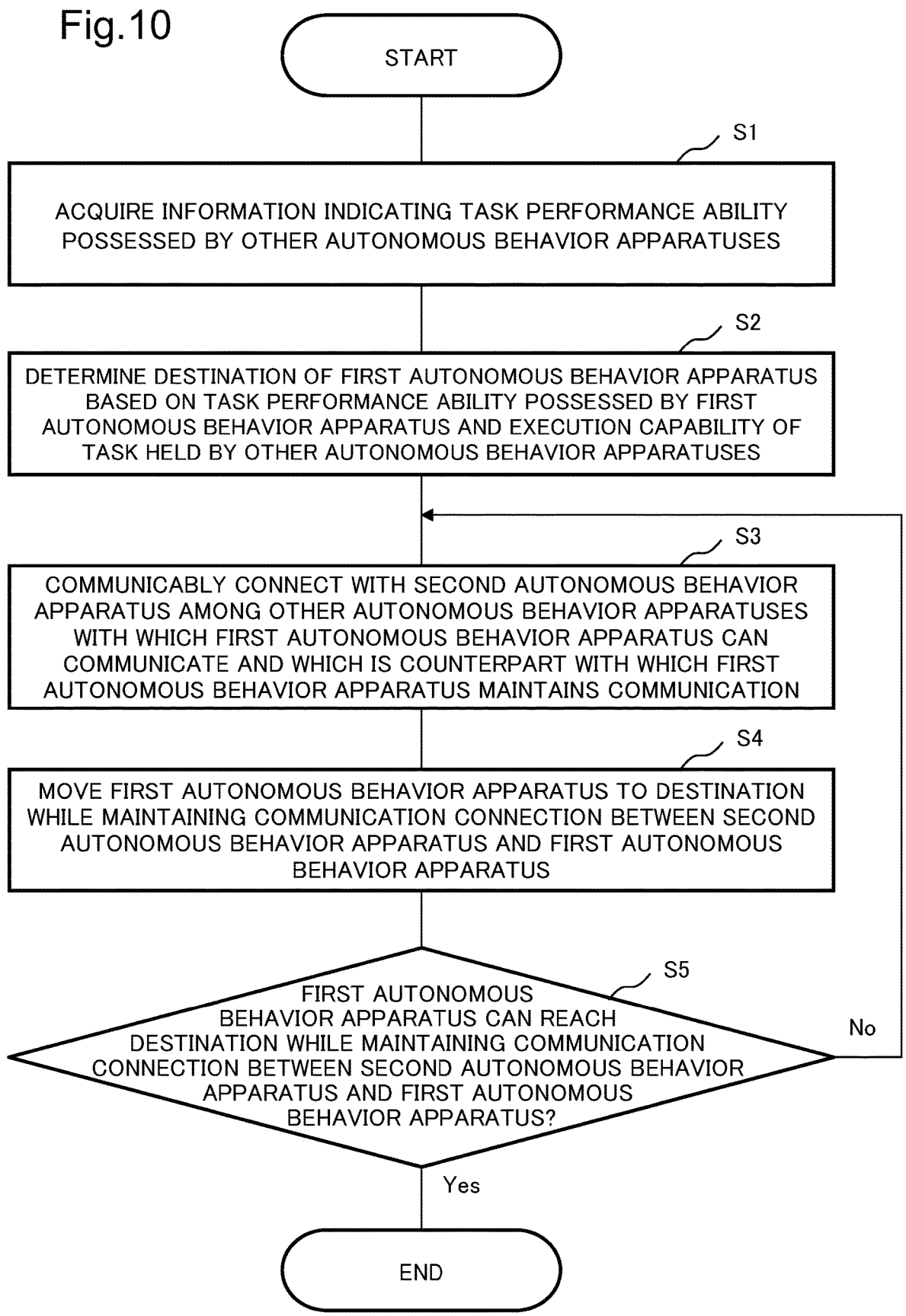
FIG. 10 is a flowchart illustrating an operation of the control device according to the third example embodiment.

An example of the operation of the control device 30 according to the third example embodiment will be described with reference to FIG. 10. FIG. 10 is a flowchart illustrating a flow of processes executed by the control device 30.

As illustrated in FIG. 10, the acquisition unit 11 acquires information indicating a task performance ability possessed by one or more other autonomous behavior apparatuses (S1). The acquisition unit 11 outputs information indicating the task performance ability possessed by one or more other autonomous behavior apparatuses to the determination unit 12.

Next, the determination unit 12 receives, from the acquisition unit 11, information indicating a task performance ability possessed by one or more other autonomous behavior apparatuses. The determination unit 12 determines the destination of the first autonomous behavior apparatus based on the task performance ability possessed by the first autonomous behavior apparatus and the task performance ability possessed by one or more other autonomous behavior apparatuses (S2). The determination unit 12 outputs information indicating the determined destination of the first autonomous behavior apparatus to the connection unit 13 and the movement control unit 14.

Thereafter, the connection unit 13 receives information indicating the destination of the first autonomous behavior apparatus from the determination unit 12. The connection unit 13 communicatively connects the first autonomous behavior apparatus to the second autonomous behavior apparatus which is a counterpart with which the first autonomous behavior apparatus maintains communication among the one or more other autonomous behavior apparatuses with which the first autonomous behavior apparatus can communicate (S3). The connection unit 13 outputs information for specifying the second autonomous behavior apparatus to the movement control unit 14.

The movement control unit 14 receives information indicating the destination of the first autonomous behavior apparatus from the determination unit 12. Furthermore, the movement control unit 14 receives information specifying the second autonomous behavior apparatus from the connection unit 13. The movement control unit 14 moves the first autonomous behavior apparatus to the destination while maintaining the communicative connection between the second autonomous behavior apparatus and the first autonomous behavior apparatus (S4).

Thereafter, the decision unit 35 decides whether the first autonomous behavior apparatus can reach the destination while maintaining the communicative connection between the second autonomous behavior apparatus and the first autonomous behavior apparatus (S5).

In a case where the first autonomous behavior apparatus can reach the destination while maintaining the communicative connection between the second autonomous behavior apparatus and the first autonomous behavior apparatus (Yes in S5), the flow ends.

On the other hand, when the first autonomous behavior apparatus cannot reach the destination while maintaining the communicative connection between the second autonomous behavior apparatus and the first autonomous behavior apparatus (No in S5), the flow returns to step S3. In that case, the connection unit 13 reselects the second autonomous behavior apparatus which is a counterpart with which the first autonomous behavior apparatus maintains communication from the one or more other autonomous behavior apparatuses with which the first autonomous behavior apparatus can communicate.

Then, the connection unit 13 communicatively connects the reselected second autonomous behavior apparatus and the first autonomous behavior apparatus. Thereafter, the flow proceeds to step S4 described above.

As described above, the operation of the control device 30 according to the third example embodiment ends.

Example of Movement Control of Autonomous Behavior Apparatus

An example of movement control of the autonomous behavior apparatus by the movement control unit 14 will be described with reference to FIGS. 11 to 16. Here, how each autonomous behavior apparatus is moved in a case where the task No. 3 having the highest priority (FIG. 4) is being performed will be specifically described with reference to the drawings.

Hereinafter, the autonomous behavior apparatus No. 1 leads the process of task No. 1. In the following description, when simply referred to as the "connection unit 13", the "movement control unit 14", or the "decision unit 35", it refers to the connection unit 13, the movement control unit 14, or the decision unit 35 of the control device 30 included in the autonomous behavior apparatus No. 1.

Figure 11:
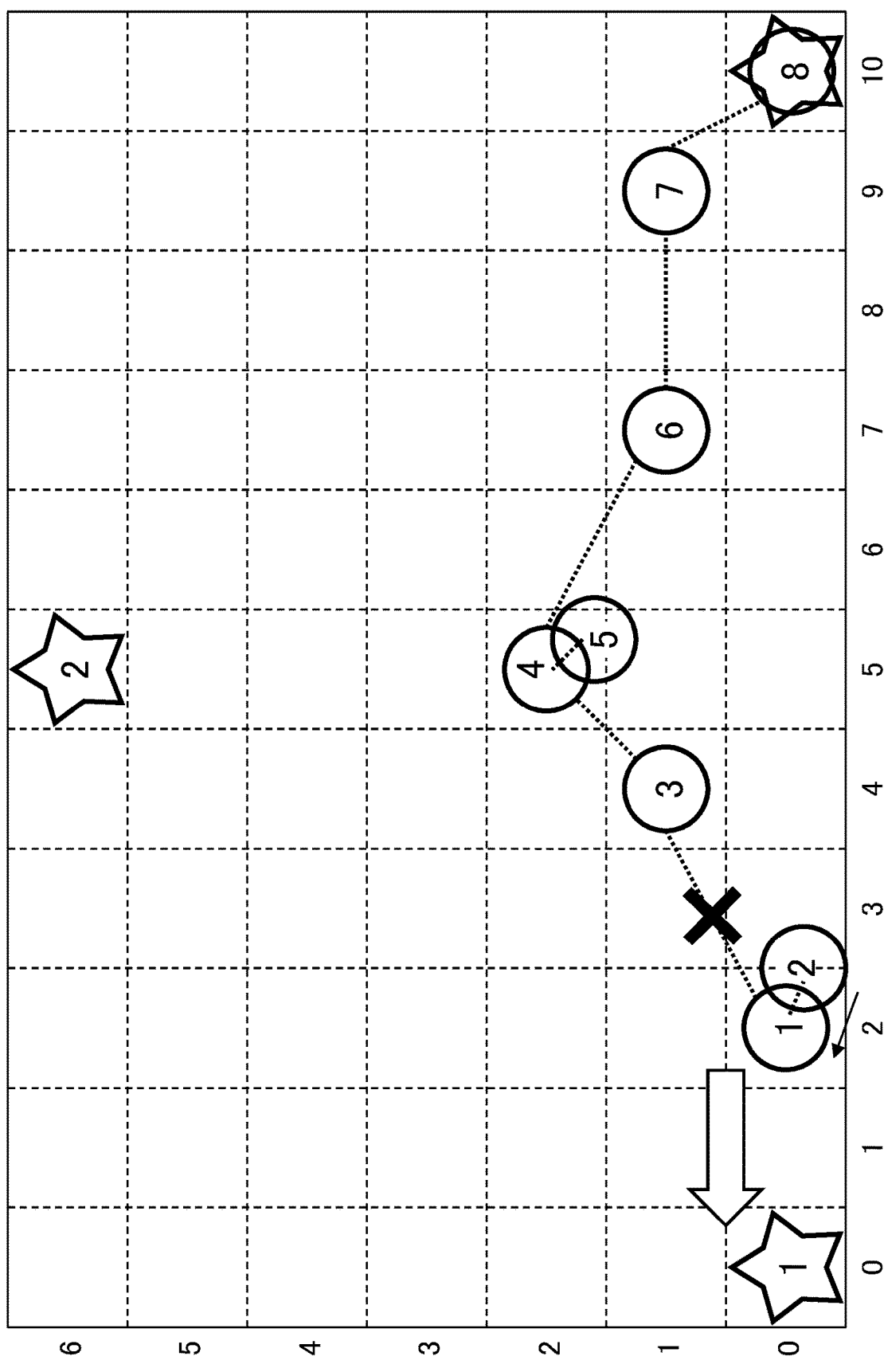
FIG. 11 is a diagram illustrating initial position distributions of three tasks and eight autonomous behavior apparatuses in the third example embodiment.

FIG. 11 is a map illustrating performing points of tasks No. 1 to No. 3 and initial positions of the autonomous behavior apparatuses of tasks No. 1 to No. 8. The autonomous behavior apparatus No. 8 is at the performing point of the task No. 3.

The autonomous behavior apparatus No. 1 sets the performing point of task No. 1 having the second highest priority as a destination. On the other hand, the one or more other autonomous behavior apparatuses have the current position of the autonomous behavior apparatus that is the transmission source of the bit information related to the task No. 1 as the destination. Here, attention is paid to the movements of the autonomous behavior apparatuses No. 1 to No. 3. For the autonomous behavior apparatuses No. 2 to No. 3, the autonomous behavior apparatus No. 1 is a transmission source of bit information related to the task No. 1, and thus corresponds to a counterpart that maintains communicative connection.

Therefore, a communicative connection is established between the autonomous behavior apparatuses No. 2 to No. 3 and the autonomous behavior apparatus No. 1. The connection unit 13 of the control device 30 included in the autonomous behavior apparatus No. 2 communicatively connects the autonomous behavior apparatus No. 1 and the autonomous behavior apparatus No. 2. The connection unit 13 of the control device 30 included in the autonomous behavior apparatus No. 3 communicatively connects the autonomous behavior apparatus No. 1 and the autonomous behavior apparatus No. 3.

As illustrated in FIG. 11, the autonomous behavior apparatus No. 1 starts moving toward the performing point of the task No. 1. The movement control unit 14 moves the autonomous behavior apparatus No. 1 to the destination. In FIG. 11, a thin arrow indicates direction of tracking, and a thick arrow indicates direction of destination.

On the other hand, the autonomous behavior apparatuses No. 2 to No. 3 both start moving toward the current position of the autonomous behavior apparatus No. 1. The movement control unit 14 of the control device 30 included in the autonomous behavior apparatus No. 2 moves the autonomous behavior apparatus No. 2. The movement control unit 14 of the control device 30 included in the autonomous behavior apparatus No. 3 moves the autonomous behavior apparatus No. 3.

Here, the decision unit 35 decides whether or not the autonomous behavior apparatus No. 1 can reach the destination while maintaining the communicative connection between the autonomous behavior apparatuses No. 2 to No. 3 (an example of the second autonomous behavior apparatus) and the autonomous behavior apparatus No. 1 (an example of the first autonomous behavior apparatus).

In one case, the decision unit 35 decides that the autonomous behavior apparatus No. 1 cannot reach the destination while maintaining the communicative connection between the autonomous behavior apparatus No. 3 and the autonomous behavior apparatus No. 1. In this case, the decision unit 35 instructs the connection unit 13 to release the communicative connection between the autonomous behavior apparatus No. 3 and the autonomous behavior apparatus No. 1.

The connection unit 13 receives an instruction to release the communicative connection between the autonomous behavior apparatus No. 3 and the autonomous behavior apparatus No. 1 from the decision unit 35. The connection unit 13 communicatively connects the autonomous behavior apparatus No. 2 and the autonomous behavior apparatus No. 3 (both are examples of the second autonomous behavior apparatus), and releases the communicative connection between the autonomous behavior apparatus No. 3 and the autonomous behavior apparatus No. 1 (an example of the first autonomous behavior apparatus). In FIG. 11, a cross mark indicates release of communicative connection.

More precisely, the connection unit 13 requests the connection unit 13 of the control device 30 included in the No. 2 autonomous behavior apparatus and the connection unit 13 of the control device 30 included in the No. 3 autonomous behavior apparatus to establish communicative connection between the No. 2 autonomous behavior apparatus and the No. 3 autonomous behavior apparatus.

The movement control unit 14 moves the autonomous behavior apparatus No. 1 to the performing point of the task No. 1 that is the destination.

Figure 12:
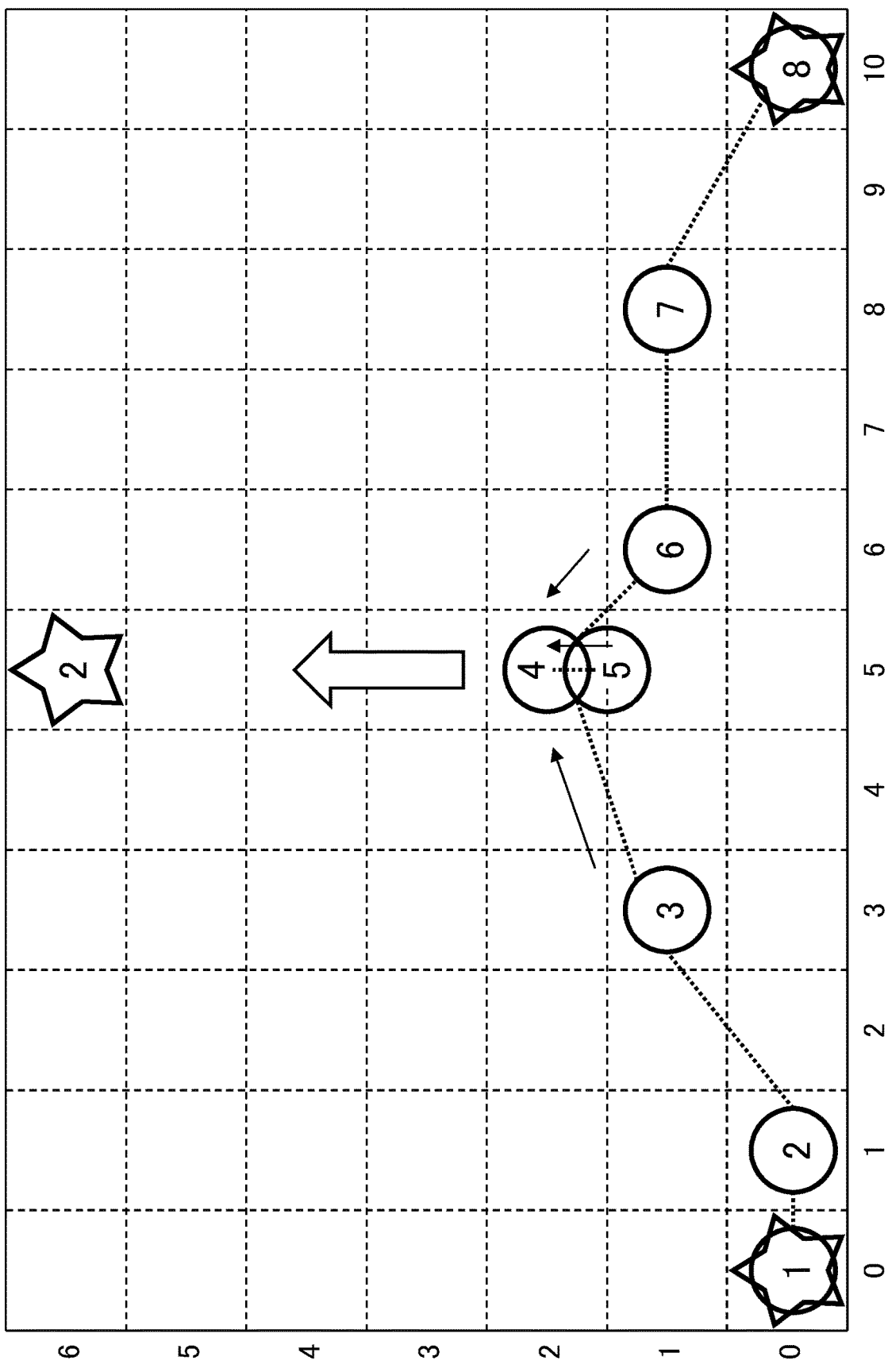
FIG. 12 is a diagram illustrating a position distribution after one flow of three tasks and eight autonomous behavior apparatuses in the third example embodiment.

FIG. 12 illustrates that the autonomous behavior apparatus No. 1 has arrived at the performing point of the task No. 1. At this time, or before or after that, the autonomous behavior apparatus No. 2 has arrived at the position where the autonomous behavior apparatus No. 1 was.

As described above, the autonomous behavior apparatus No. 2 moves so as to track the autonomous behavior apparatus No. 1, whereby the autonomous behavior apparatus No. 2 can maintain the communicative connection with the autonomous behavior apparatus No. 1. In addition, the autonomous behavior apparatus No. 1 can move to the performing point of the task No. 1 without going out of the effective distance of communication with the autonomous behavior apparatus No. 2.

In other words, since the autonomous behavior apparatus No. 2 moves so as to track the autonomous behavior apparatus No. 1, the restriction related the movement with respect to the autonomous behavior apparatus No. 1 can be reduced.

Hereinafter, the autonomous behavior apparatus No. 4 leads the process of task No. 2. In the following description, when simply referred to as the "connection unit 13", the "movement control unit 14", or the "decision unit 35", it refers to the connection unit 13, the movement control unit 14, or the decision unit 35 of the control device 30 included in the autonomous behavior apparatus No. 4.

As illustrated in FIG. 12, after the autonomous behavior apparatus No. 1 arrives at the performing point of the task No. 1, the autonomous behavior apparatus No. 4 starts moving toward the performing point of the task No. 2 having the lowest priority. The movement control unit 14 moves the autonomous behavior apparatus No. 4 to the destination. In FIG. 12, a thin arrow indicates direction of tracking, and a thick arrow indicates direction of destination.

On the other hand, the autonomous behavior apparatuses No. 3, No. 5, and No. 6 start moving toward the current position of the autonomous behavior apparatus No. 4. The movement control unit 14 of the control device 30 included in the autonomous behavior apparatus No. 3 moves the autonomous behavior apparatus No. 3. The movement control unit 14 of the control device 30 included in the autonomous behavior apparatus No. 5 moves the autonomous behavior apparatus No. 5.

The movement control unit 14 of the control device 30 included in the autonomous behavior apparatus No. 6 moves the autonomous behavior apparatus No. 6.

Figure 13:
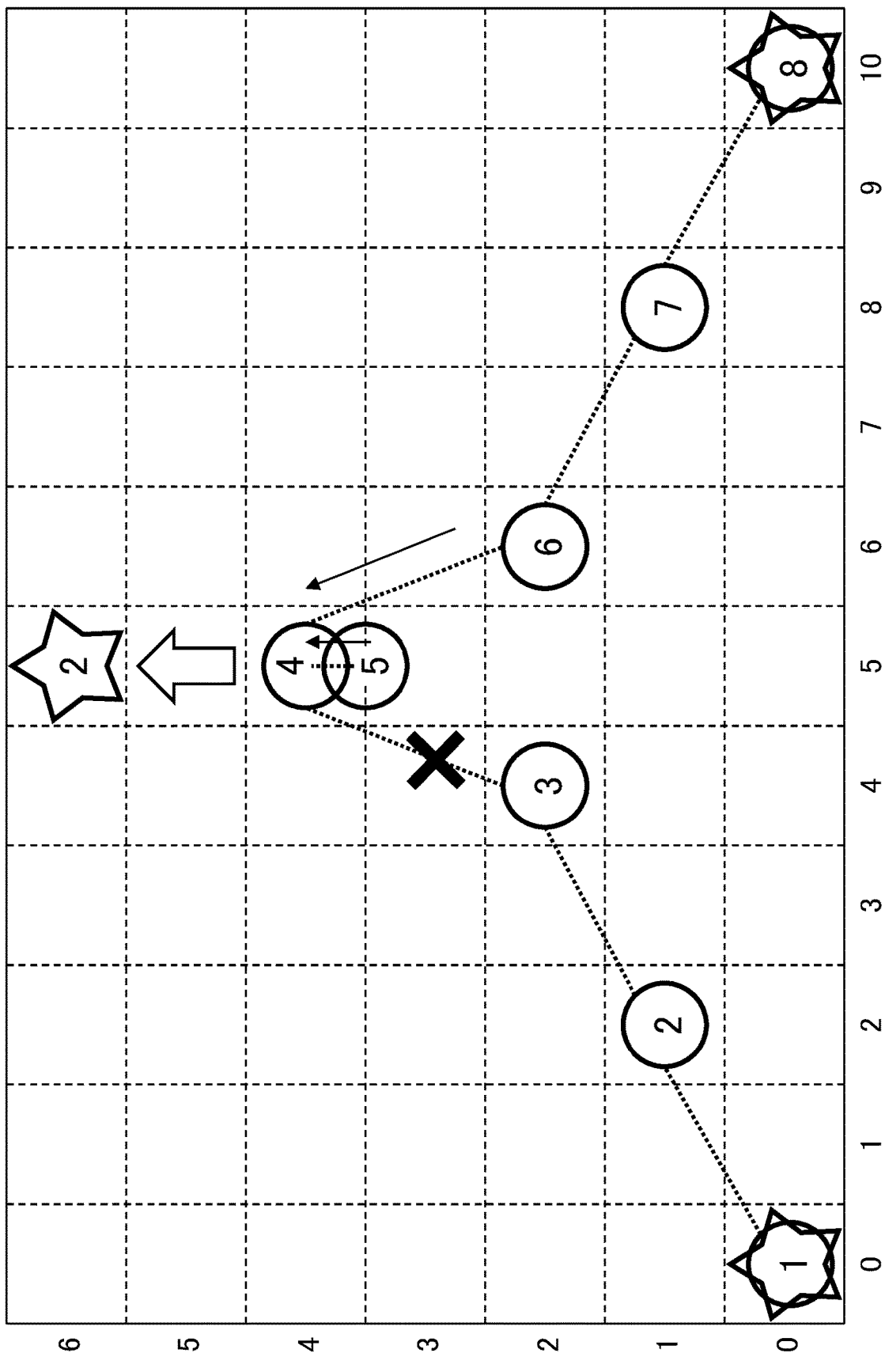
FIG. 13 is a diagram illustrating a position distribution after two flows of three tasks and eight autonomous behavior apparatuses in the third example embodiment.

FIG. 13 illustrates that each of the autonomous behavior apparatuses No. 3 to No. 6 start moving toward the destination of the own autonomous behavior apparatus.

Here, the decision unit 35 decides whether or not the autonomous behavior apparatus No. 4 can reach the destination while maintaining the communicative connection between the autonomous behavior apparatuses No. 3, No. 5 and No. 6 (an example of the second autonomous behavior apparatus) and the autonomous behavior apparatus No. 4 (an example of the first autonomous behavior apparatus).

In one case, the decision unit 35 decides that the autonomous behavior apparatus No. 4 cannot reach the destination while maintaining the communicative connection between the autonomous behavior apparatuses No. 3 and No. 6 and the autonomous behavior apparatus No. 4. In this case, the decision unit 35 instructs the connection unit 13 to release the communicative connection between the autonomous behavior apparatuses No. 3 and No. 6 and the autonomous behavior apparatus No. 4.

The connection unit 13 receives an instruction to release the communicative connection between the autonomous behavior apparatuses No. 3 and No. 6 and the autonomous behavior apparatus No. 4 from the decision unit 35. The connection unit 13 communicatively connects the autonomous behavior apparatus No. 3 and the autonomous behavior apparatus No. 5 (both are examples of the second autonomous behavior apparatus), and releases the communicative connection between the autonomous behavior apparatus No. 3 and the autonomous behavior apparatus No. 4 (an example of the first autonomous behavior apparatus).

The movement control unit 14 moves the autonomous behavior apparatus No. 4 to the performing point of the task No. 2 that is the destination.

Figure 14:
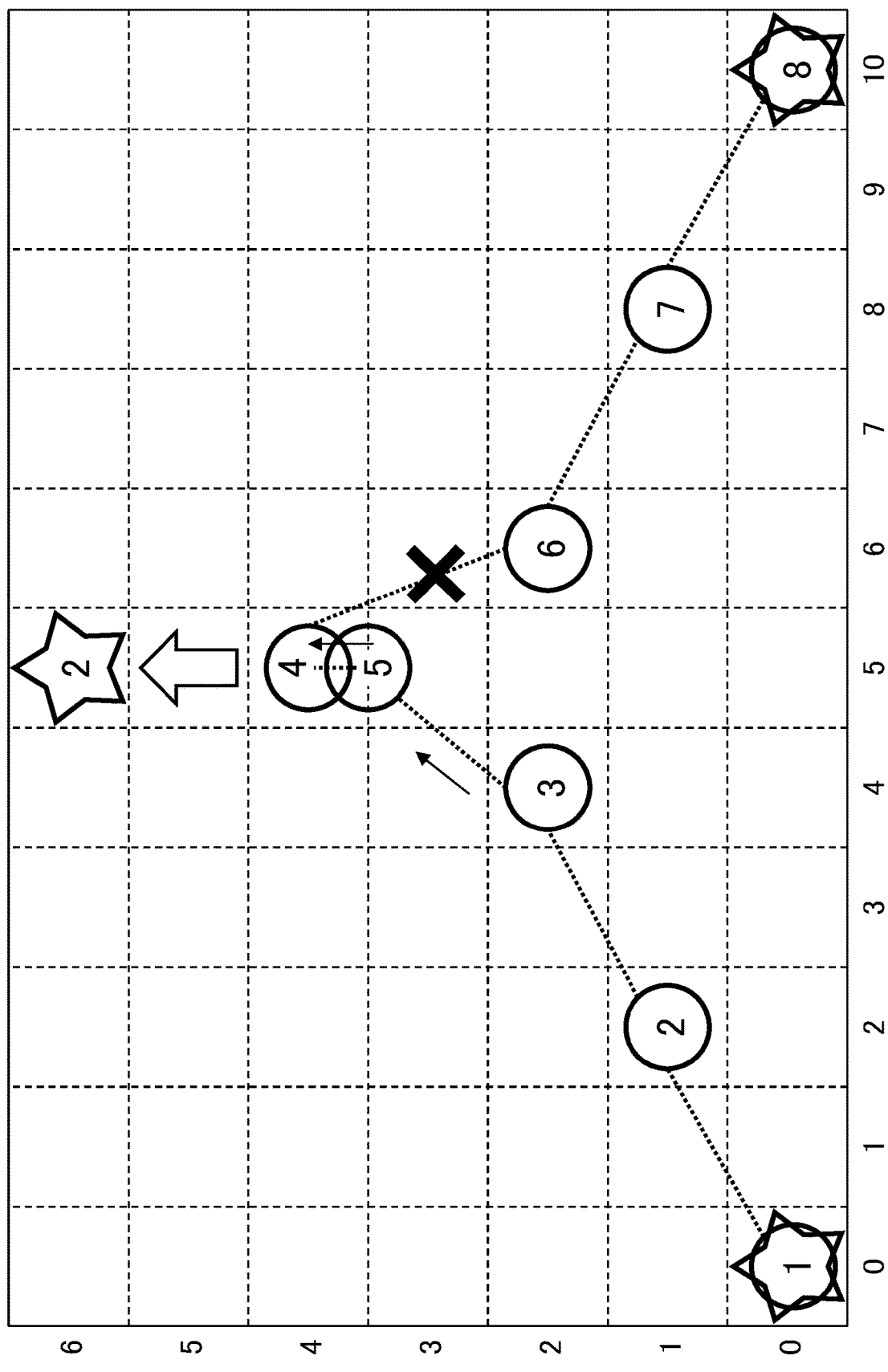
FIG. 14 is a diagram illustrating a position distribution after three flows of three tasks and eight autonomous behavior apparatuses in the third example embodiment.

FIG. 14 illustrates that the communicative connection between the autonomous behavior apparatus No. 3 and the autonomous behavior apparatus No. 4 is released.

In addition, the connection unit 13 communicatively connects the autonomous behavior apparatus No. 6 and the autonomous behavior apparatus No. 5 (both are examples of the second autonomous behavior apparatus), and releases the communicative connection between the autonomous behavior apparatus No. 6 and the autonomous behavior apparatus No. 4 (an example of the first autonomous behavior apparatus). More precisely, the connection unit 13 requests the connection unit 13 of the control device 30 included in the autonomous behavior apparatus No. 5 and the connection unit 13 of the control device 30 included in the autonomous behavior apparatus No. 6 to establish communicative connection between the autonomous behavior apparatus No. 6 and the autonomous behavior apparatus No. 5.

Figure 15:
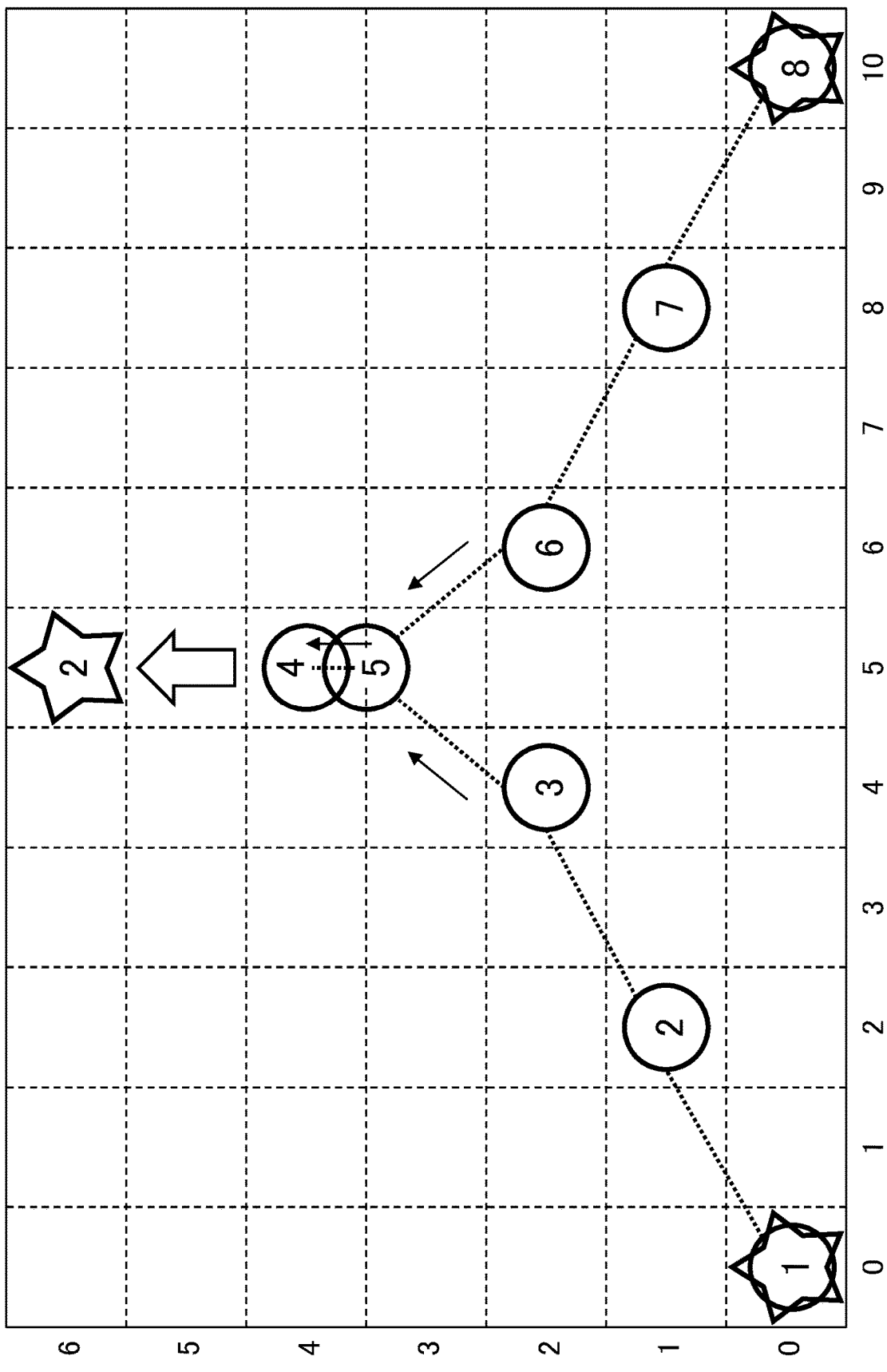
FIG. 15 is a diagram illustrating a position distribution after four flows of three tasks and eight autonomous behavior apparatuses in the third example embodiment.

FIG. 15 illustrates that the communicative connection between the autonomous behavior apparatus No. 6 and the autonomous behavior apparatus No. 4 is released. In FIG. 15, communicative connection is established between the autonomous behavior apparatus No. 5 and the autonomous behavior apparatus No. 4. Furthermore, communicative connection is established between the autonomous behavior apparatuses No. 3 and No. 6 and the autonomous behavior apparatus No. 5.

Figure 16:
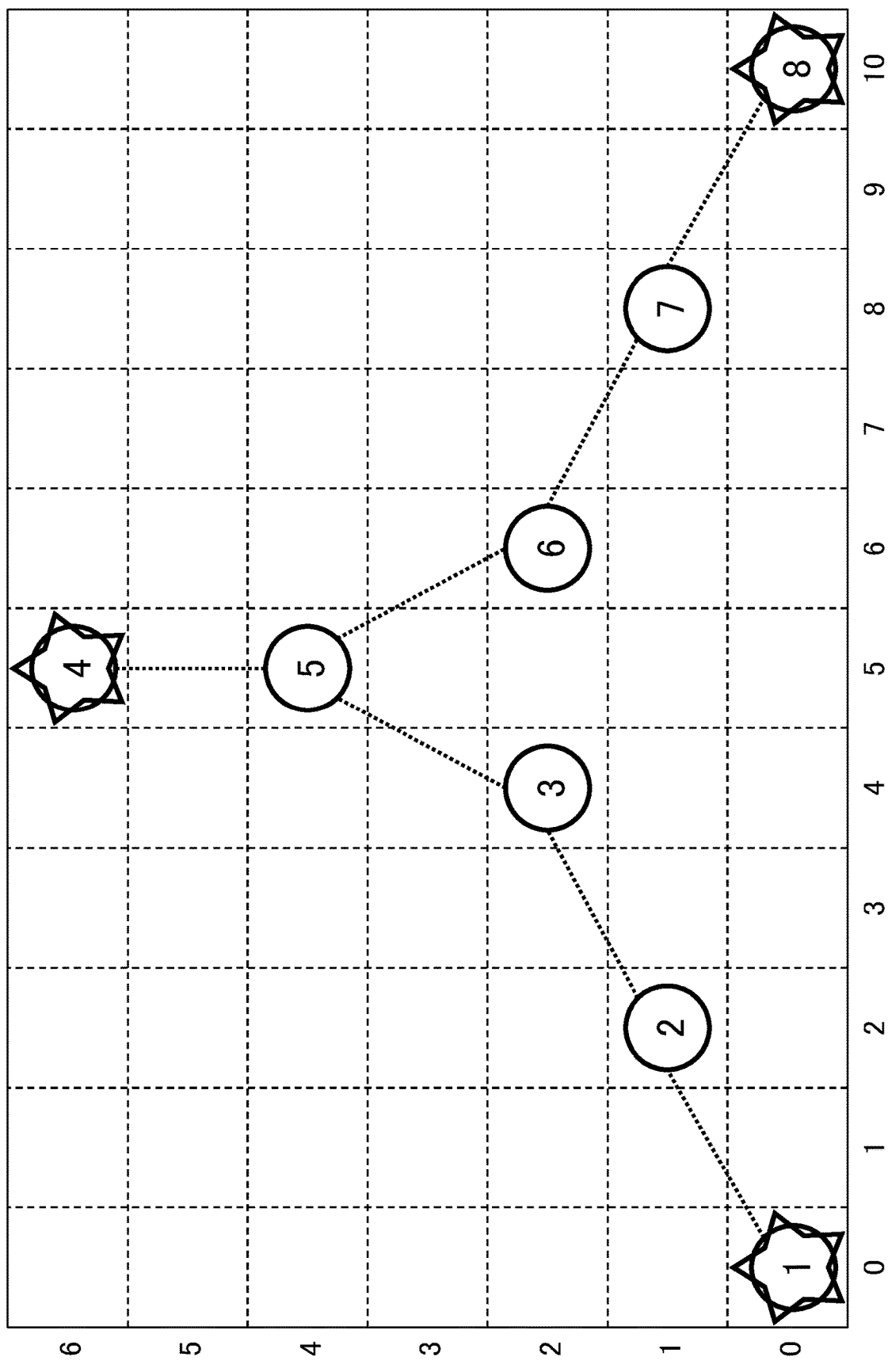
FIG. 16 is a diagram illustrating a position distribution after five flows of three tasks and eight autonomous behavior apparatuses in the third example embodiment.

FIG. 16 illustrates that the autonomous behavior apparatus No. 4 has arrived at the performing point of the task No. 2. At this time, or before or after that, the autonomous behavior apparatus No. 5 has arrived at the position where the autonomous behavior apparatus No. 4 was. As described above, the autonomous behavior apparatus No. 5 moves so as to track the autonomous behavior apparatus No. 4, whereby the autonomous behavior apparatus No. 5 can maintain the communicative connection with the autonomous behavior apparatus No. 4. In addition, the autonomous behavior apparatus No. 4 can move to the performing point of the task No. 2 without going out of the effective distance of communication with the autonomous behavior apparatus No. 5.

In other words, since the autonomous behavior apparatus No. 5 moves so as to track the autonomous behavior apparatus No. 4, the restriction related the movement with respect to the autonomous behavior apparatus No. 4 can be reduced.

As described above, the movable range of the first autonomous behavior apparatus can be expanded by releasing the communicative connection between some (one or more) of the second autonomous behavior apparatuses and the first autonomous behavior apparatus. As a result, the first autonomous behavior apparatus can reach the destination while maintaining the communicative connection with the remaining second autonomous behavior apparatuses.

Effects of Present Example Embodiment

According to the configuration of the present example embodiment, the acquisition unit 21 acquires information indicating the task performance ability possessed by one or more other autonomous behavior apparatuses. The determination unit 22 determines the destination of the first autonomous behavior apparatus based on the task performance ability possessed by the first autonomous behavior apparatus and the task performance ability possessed by one or more other autonomous behavior apparatuses. The connection unit 13 communicatively connects the second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus The movement control unit 14 moves the first autonomous behavior apparatus to the destination while maintaining the communicative connection between the second autonomous behavior apparatus and the first autonomous behavior apparatus.

As a result, the first autonomous behavior apparatus determines the destination of the own autonomous behavior apparatus based on the comparison result of the task performance ability possessed by the own autonomous behavior apparatus with respect to the task performance ability possessed by one or more other autonomous behavior apparatuses. In addition, the first autonomous behavior apparatus moves to the destination of the own autonomous behavior apparatus while maintaining the communicative connection with the second autonomous behavior apparatus. Therefore, even in a situation where a plurality of autonomous behavior apparatuses are distributed, it is possible to cause the plurality of autonomous behavior apparatuses to efficiently perform the task.

Furthermore, according to the configuration of the present example embodiment, the decision unit 35 decides whether or not the first autonomous behavior apparatus can reach the destination while maintaining the communicative connection between the second autonomous behavior apparatus and the first autonomous behavior apparatus.

In accordance with the decision result, the connection unit 13 releases the communicative connection between some of the second autonomous behavior apparatuses and the first autonomous behavior apparatus. As a result, the first autonomous behavior apparatus can reach the destination while maintaining the communicative connection with the remaining second autonomous behavior apparatuses.

(Regarding Hardware Configuration)

Figure 17:
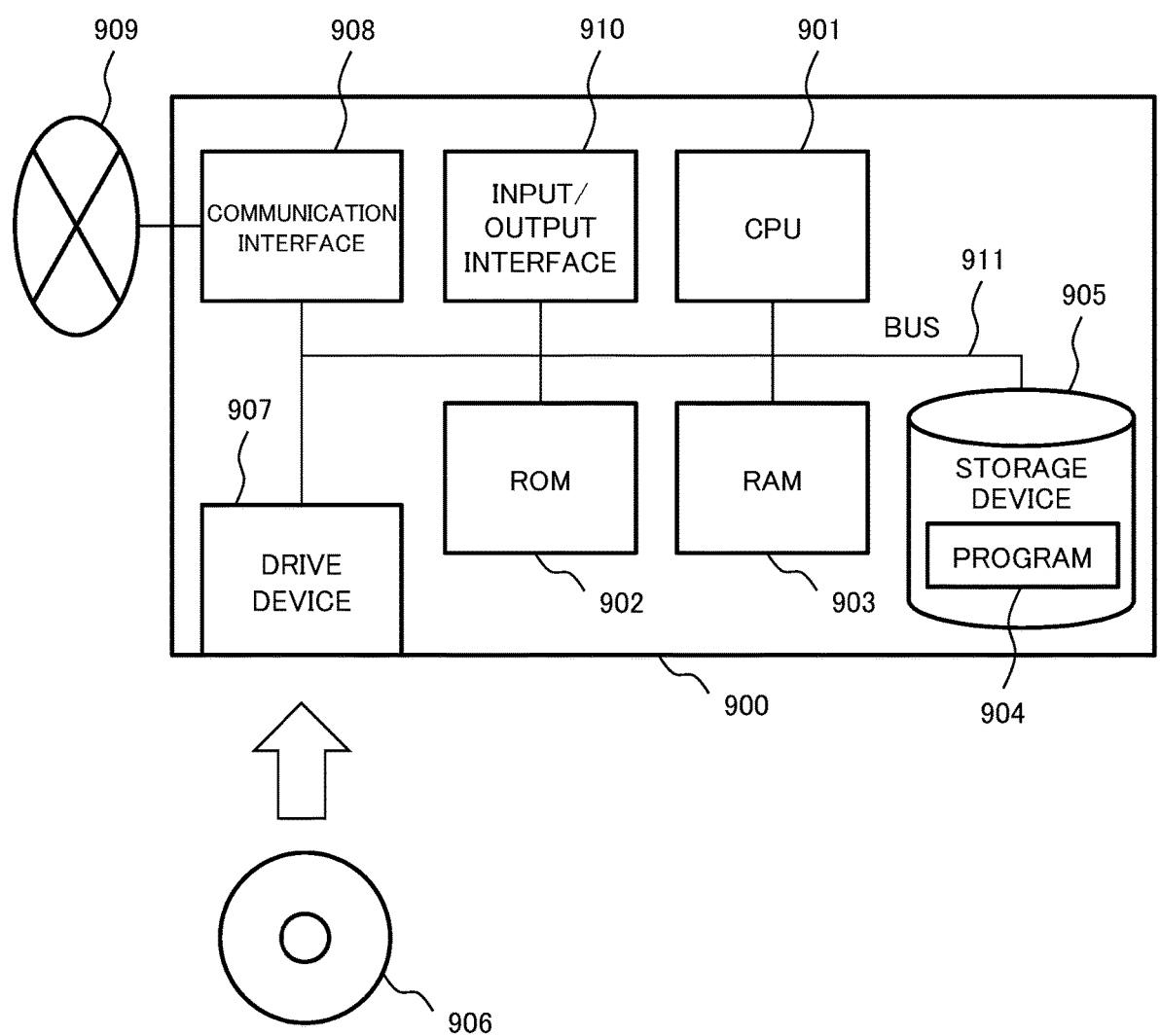
FIG. 17 is a diagram schematically illustrating a hardware configuration of a control device according to any one of the first to third example embodiments.

Each component of the control devices 10, 20, and 30 described in the first to third example embodiments represents a functional unit block. Some or all of these components are realized by the information processing device 900 as illustrated in, for example, FIG. 17. FIG. 17 is a block diagram illustrating an example of a hardware configuration of the information processing device 900.

As illustrated in FIG. 17, the information processing device 900 includes the following configuration as an example.

CPU (Central Processing Unit) 901
ROM (Read Only Memory) 902
RAM (Random Access Memory) 903
Program 904 loaded into RAM 903
Storage device 905 storing program 904
Drive device 907 that reads and writes recording medium 906
Communication interface 908 connected to communication network 909
Input/output interface 910 for inputting/outputting data
Bus 911 connecting each component The components of the control devices 10, 20, and 30 described in the first to third example embodiments are realized by the CPU 901 reading and executing a program 904 that implements these functions. The program 904 for realizing the function of each component is stored in the storage device 905 or the ROM 902 in advance, for example, and the CPU 901 loads the program into the RAM 903 and executes the program as necessary. Note that the program 904 may be supplied to the CPU 901 via the communication network 909, or may be stored in advance in the recording medium 906, and the drive device 907 may read the program and supply the program to the CPU 901.

According to the above configuration, the control devices 10, 20, and 30 described in the first to third example embodiments are realized as hardware. Therefore, effects similar to the effects described in the above example embodiment can be obtained.

(Supplementary Note)

One aspect of the present invention is also described as the following supplementary notes, but is not limited to the following.

(Supplementary Note 1)

A control device including:

an acquisition means configured to acquire information indicating a task performance ability possessed by one or more other autonomous behavior apparatuses;

a determination means configured to determine a destination of a first autonomous behavior apparatus based on a task performance ability possessed by the first autonomous behavior apparatus and a task performance ability possessed by the one or more other autonomous behavior apparatuses;

a connection means configured to communicatively connect a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection, based on the destination of the first autonomous behavior apparatus; and a movement control means configured to move the first autonomous behavior apparatus to the destination while maintaining a communicative connection between the second autonomous behavior apparatus and the first autonomous behavior apparatus.

(Supplementary Note 2)

The control device according to supplementary note 1, wherein in a case where there is only one second autonomous behavior apparatus, the connection means changes a counterpart with which the first autonomous behavior apparatus communication connects from the second autonomous behavior apparatus to other autonomous behavior apparatuses with which the first autonomous behavior apparatus can communicate.

(Supplementary Note 3)

The control device according to supplementary note 1, wherein in a case where there is a plurality of the second autonomous behavior apparatuses, the connection means causes communicative connection between any two of the second autonomous behavior apparatuses that can communicate with each other among the second autonomous behavior apparatuses, and releases the communicative connection between one of the second autonomous behavior apparatuses and the first autonomous behavior apparatus.

(Supplementary Note 4)

The control device according to any one of supplementary notes 1 to 3, further including a decision means configured to decide whether or not the first autonomous behavior apparatus can reach the destination while maintaining a communicative connection between the second autonomous behavior apparatus and the first autonomous behavior apparatus.

(Supplementary Note 5)

The control device according to supplementary note 4, wherein the decision means decides whether or not the first autonomous behavior apparatus can reach the destination based on a restriction regarding movement of the second autonomous behavior apparatus and an effective distance of communication.

(Supplementary Note 6)

The control device according to any one of supplementary notes 1 to 5, wherein in a case where a task performance ability possessed by the first autonomous behavior apparatus exceeds a task performance ability possessed by one or more other autonomous behavior apparatuses, the determination means determines a performing point of the task as a destination of the first autonomous behavior apparatus.

(Supplementary Note 7)

The control device according to any one of supplementary notes 1 to 5, wherein in a case where there are the plurality of the second autonomous behavior apparatuses, and a task performance ability possessed by the first autonomous behavior apparatus is equal to or less than a task performance ability possessed by the one or more other autonomous behavior apparatuses, the determination means determines, as a destination of the first autonomous behavior apparatus, a current position of the other autonomous behavior apparatus that has notified the first autonomous behavior apparatus of an autonomous behavior apparatus having the highest task performance ability among the one or more other autonomous behavior apparatuses.

(Supplementary Note 8)

The control device according to any one of supplementary notes 1 to 5, wherein in a case where there is only one second autonomous behavior apparatus, and a task performance ability possessed by the first autonomous behavior apparatus is equal to or less than a task performance ability possessed by the one or more other autonomous behavior apparatuses, the determination means determines the current position of the other autonomous behavior apparatus as the destination of the first autonomous behavior apparatus.

(Supplementary Note 9)

The control device according to any one of supplementary notes 1 to 7, wherein there is a plurality of the tasks, and a priority is set for each task; and the determination means determines a destination of the first autonomous behavior apparatus based on a performing point of a task having the highest priority among the plurality of tasks and a current position of the other autonomous behavior apparatus.

(Supplementary Note 10)

A control method including the steps of:
acquiring information indicating a task performance ability possessed by one or more other autonomous behavior apparatuses;
determining a destination of a first autonomous behavior apparatus based on a task performance ability possessed by the first autonomous behavior apparatus and the task performance ability possessed by the other autonomous behavior apparatus;
communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection, based on the destination of the first autonomous behavior apparatus; and moving the first autonomous behavior apparatus to the destination while maintaining a communicative connection between the second autonomous behavior apparatus and the first autonomous behavior apparatus.

(Supplementary Note 11)

A non-transitory recording medium storing a program for causing a computer to execute:
acquiring information indicating a task performance ability possessed by one or more other autonomous behavior apparatuses;
determining a destination of a first autonomous behavior apparatus based on a task performance ability possessed by the first autonomous behavior apparatus and the task performance ability possessed by the other autonomous behavior apparatus;
communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection, based on the destination of the first autonomous behavior apparatus; and
moving the first autonomous behavior apparatus to the destination while maintaining a communicative connection between the second autonomous behavior apparatus and the first autonomous behavior apparatus.

REFERENCE SIGNS LIST 10 control device
11 acquisition unit
12 determination unit
13 connection unit
14 movement control unit
20 control device
21 acquisition unit
22 determination unit
30 control device
35 decision unit

What is claimed is:

1. A control device for controlling a first autonomous apparatus, comprising:
a memory configured to store instructions; and
at least one processor configured to execute the instructions to perform:
acquiring information indicating a task performance ability possessed by one or more other autonomous behavior apparatuses;
determining a destination of the first autonomous behavior apparatus based on a task performance ability possessed by the first autonomous behavior apparatus and a task performance ability possessed by the one or more other autonomous behavior apparatuses;
communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus; and
moving the first autonomous behavior apparatus to the destination while maintaining a communicative connection between the second autonomous behavior apparatus and the first autonomous behavior apparatus, wherein the at least one processor is configured to execute the instructions to perform:

in a case where the first autonomous behavior apparatus cannot reach the destination while maintaining the communicative connection between the second autonomous behavior apparatus and the first autonomous behavior apparatus, changing a counterpart with which the first autonomous behavior apparatus communication connects from the second autonomous behavior apparatus to another autonomous behavior apparatuses with which the first autonomous behavior apparatus is communicable.

2. The control device according to claim 1, wherein the at least one processor is configured to execute the instructions to perform:

in a case where there is another autonomous behavior apparatus other than the first autonomous behavior apparatus with which the second autonomous behavior apparatus communicatively connect and the first autonomous behavior apparatus and the another behavior apparatus is communicable, causing communicative connection between the first autonomous behavior apparatus and the another behavior apparatus, and releasing the communicative connection between the second autonomous behavior apparatus and the first autonomous behavior apparatus.

3. The control device according to claim 1, wherein the at least one processor is further configured to execute the instructions to perform:

deciding whether or not the first autonomous behavior apparatus can reach the destination while maintaining a communicative connection between the second autonomous behavior apparatus and the first autonomous behavior apparatus.

4. The control device according to claim 3, wherein the at least one processor is configured to execute the instructions to perform:

deciding whether or not the first autonomous behavior apparatus can reach the destination based on a restriction regarding movement of the second autonomous behavior apparatus and an effective distance of communication.

5. The control device according to claim 1, wherein the at least one processor is configured to execute the instructions to perform:

in a case where the task performance ability possessed by the first autonomous behavior apparatus exceeds the task performance ability possessed by the one or more other autonomous behavior apparatuses, determining a performing point of the task as the destination of the first autonomous behavior apparatus.

6. The control device according to claim 1, wherein the at least one processor is configured to execute the instructions to perform:

in a case where there are one or more other autonomous behavior apparatuses, and a task performance ability possessed by the first autonomous behavior apparatus is equal to or less than a task performance ability possessed by the one or more other autonomous behavior apparatuses, determining, as a destination of the first autonomous behavior apparatus, a current position of the other autonomous behavior apparatus that has notified the first autonomous behavior apparatus of an autonomous behavior apparatus having a highest task performance ability among the one or more other autonomous behavior apparatuses.

7. The control device according to claim 1, wherein the at least one processor is configured to execute the instructions to perform:

in a case where there is only one other behavior apparatus, and a task performance ability possessed by the first autonomous behavior apparatus is equal to or less than a task performance ability possessed by the one or more other autonomous behavior apparatuses, determining a current position of the one or more other autonomous behavior apparatuses as the destination of the first autonomous behavior apparatus.

8. The control device according to claim 1, wherein there is a plurality of tasks, and a priority is set for each task; and the at least one processor is configured to execute the instructions to perform:

determining a destination of the first autonomous behavior apparatus based on a performing point of a task having a highest priority among the plurality of tasks and a current position of the one or more other autonomous behavior apparatuses.

9. A control method for controlling a first autonomous apparatus, comprising steps of:

acquiring information indicating a task performance ability possessed by one or more other autonomous behavior apparatuses;

determining a destination of the first autonomous behavior apparatus based on a task performance ability possessed by the first autonomous behavior apparatus and a task performance ability possessed by the one or more other autonomous behavior apparatuses;

communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection based on the destination of the first autonomous behavior apparatus; and moving the first autonomous behavior apparatus to the destination while maintaining a communicative connection between the second autonomous behavior apparatus and the first autonomous behavior apparatus, wherein the control method comprises:

in a case where the first autonomous behavior apparatus cannot reach the destination while maintaining the communicative connection between the second autonomous behavior apparatus and the first autonomous behavior apparatus, changing a counterpart with which the first autonomous behavior apparatus communication connects from the second autonomous behavior apparatus to another autonomous behavior apparatus with which the first autonomous behavior apparatus is communicable.

10. A non-transitory recording medium storing a program for controlling a first autonomous apparatus and causing a computer to execute:

acquiring information indicating a task performance ability possessed by one or more other autonomous behavior apparatuses;

determining a destination of the first autonomous behavior apparatus based on a task performance ability possessed by the first autonomous behavior apparatus and the task performance ability possessed by the other autonomous behavior apparatus;

communicatively connecting a second autonomous behavior apparatus and the first autonomous behavior apparatus, the second autonomous behavior apparatus being among the one or more other autonomous behavior apparatuses with which the first autonomous behavior apparatus can communicate and being a counterpart with which the first autonomous behavior apparatus will maintain the communicative connection, based on the destination of the first autonomous behavior apparatus; and moving the first autonomous behavior apparatus to the destination while maintaining a communicative connection between the second autonomous behavior apparatus and the first autonomous behavior apparatus, wherein the program causes the computer to execute:

in a case where the first autonomous behavior apparatus cannot reach the destination while maintaining the communicative connection between the second autonomous behavior apparatus and the first autonomous behavior apparatus, changing a counterpart with which the first autonomous behavior apparatus communication connects from the second autonomous behavior apparatus to another autonomous behavior apparatus with which the first autonomous behavior apparatus is communicable.

* * * * *